(12) United States Patent
Suzuki et al.

US012090969B2

(10) Patent No.: US 12,090,969 B2
(45) Date of Patent: Sep. 17, 2024

(54) VEHICLE SENSOR CLEANING SYSTEMS

(71) Applicant: KOITO MANUFACTURING CO., LTD., Tokyo (JP)

(72) Inventors: Kazuhiro Suzuki, Shizuoka (JP); Yusuke Funami, Shizuoka (JP); Toshihisa Hayami, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 489 days.

(21) Appl. No.: 17/620,396

(22) PCT Filed: Jun. 8, 2020

(86) PCT No.: PCT/JP2020/022569
§ 371 (c)(1),
(2) Date: Dec. 17, 2021

(87) PCT Pub. No.: WO2020/255781
PCT Pub. Date: Dec. 24, 2020

(65) Prior Publication Data
US 2022/0348168 A1    Nov. 3, 2022

(30) Foreign Application Priority Data

Jun. 19, 2019  (JP) .................................. 2019-113845
Jun. 19, 2019  (JP) .................................. 2019-113846

(51) Int. Cl.
*B60S 1/56*    (2006.01)
*B60S 1/48*    (2006.01)

(52) U.S. Cl.
CPC .................. *B60S 1/56* (2013.01); *B60S 1/485* (2013.01)

(58) Field of Classification Search
None
See application file for complete search history.

(56) References Cited

U.S. PATENT DOCUMENTS 9,083,864 B2 *   7/2015  Reed .................... G03B 17/02
2014/0009616 A1 * 1/2014  Nakamura ............ G06T 7/0002
                                                      348/148

(Continued)

FOREIGN PATENT DOCUMENTS

CN       105905075 A    8/2016
JP       2001171491 A   6/2001

(Continued)

OTHER PUBLICATIONS

Search Report issued Jul. 8, 2022 by the European Patent Office in counterpart European Patent Application No. 20826205.5.

(Continued)

*Primary Examiner* — Bernard G Lindsay
(74) *Attorney, Agent, or Firm* — Sughrue Mion, PLLC

(57) ABSTRACT

A sensor system equipped with a vehicular cleaner comprising: a sensor configured to operate in a normal mode and a standby mode; a cleaner unit configured to clean the sensor in response to an operation signal output in accordance with a dirt determination result of the sensor; and a control unit configured to control the sensor and the cleaner unit. The sensor is configured to operate in the normal mode, in which the sensor is operated at a predetermined cycle, and in the standby mode, in which the sensor is operated at a cycle longer than in the normal mode. The cleaner unit is configured to operate in a regular mode in which the cleaner unit operates in response to the operation signal and to operate in a block mode in which the cleaner unit does not operate even when the operation signal is input.

5 Claims, 17 Drawing Sheets

(56) References Cited

U.S. PATENT DOCUMENTS

| | | |
|---|---|---|
| 2016/0271905 A1 | 9/2016 | Lo |
| 2016/0271926 A1 | 9/2016 | Lo |
| 2016/0272036 A1 | 9/2016 | Chen et al. |
| 2016/0272039 A1 | 9/2016 | Cheng |
| 2016/0272040 A1 | 9/2016 | Cheng |
| 2016/0272043 A1 | 9/2016 | Cheng |
| 2016/0272044 A1 | 9/2016 | Cheng |
| 2016/0272045 A1 | 9/2016 | Chen et al. |
| 2016/0272082 A1 | 9/2016 | Chuang |
| 2016/0272083 A1 | 9/2016 | Dai |
| 2016/0272084 A1 | 9/2016 | Chuang |
| 2016/0272085 A1 | 9/2016 | Dai |
| 2016/0272087 A1 | 9/2016 | Lai |
| 2016/0272164 A1 | 9/2016 | Hsiao et al. |
| 2016/0272165 A1 | 9/2016 | Hsiao et al. |
| 2016/0272214 A1 | 9/2016 | Chen |
| 2016/0272242 A1 | 9/2016 | Sham |
| 2016/0272254 A1 | 9/2016 | Wu |
| 2016/0274668 A1 | 9/2016 | Hsiao et al. |
| 2016/0274669 A1 | 9/2016 | Hsiao et al. |
| 2016/0276638 A1 | 9/2016 | Sham |
| 2016/0276721 A1 | 9/2016 | Ho |
| 2016/0276722 A1 | 9/2016 | Ho |
| 2016/0276854 A1 | 9/2016 | Lian |
| 2016/0276855 A1 | 9/2016 | Lian |
| 2016/0276903 A1 | 9/2016 | Lai |
| 2016/0276905 A1 | 9/2016 | Lai |
| 2016/0276963 A1 | 9/2016 | Lai |
| 2016/0325638 A1 | 11/2016 | Dai |
| 2016/0336628 A1 | 11/2016 | Ho |
| 2016/0339797 A1 | 11/2016 | Dai |
| 2016/0355103 A1 | 12/2016 | Lai |
| 2017/0008572 A1 | 1/2017 | Wu |
| 2017/0057374 A1 | 3/2017 | Ho |
| 2017/0057377 A1 | 3/2017 | Lo |
| 2017/0072768 A1 | 3/2017 | Cheng |
| 2017/0077855 A1 | 3/2017 | Lai |
| 2017/0080774 A1 | 3/2017 | Cheng |
| 2017/0080775 A1 | 3/2017 | Cheng |
| 2017/0080776 A1 | 3/2017 | Cheng |
| 2017/0080904 A1 | 3/2017 | Hsiao et al. |
| 2017/0113509 A1 | 4/2017 | Chen et al. |
| 2017/0137052 A1 | 5/2017 | Sham |
| 2017/0149035 A1 | 5/2017 | Sham |
| 2017/0158059 A1 | 6/2017 | Dai |
| 2017/0166032 A1 | 6/2017 | Chen et al. |
| 2017/0182981 A1 | 6/2017 | Hsiao et al. |
| 2017/0185266 A1 | 6/2017 | Dai |
| 2017/0185274 A1 | 6/2017 | Ding |
| 2017/0235371 A1 | 8/2017 | Hsiao et al. |
| 2017/0259490 A1 | 9/2017 | Lo |
| 2017/0282867 A1 | 10/2017 | Sham |
| 2017/0288431 A1 | 10/2017 | Lian |
| 2017/0291470 A1 | 10/2017 | Cheng |
| 2017/0297409 A9 | 10/2017 | Ho |
| 2017/0317325 A1 | 11/2017 | Sham |
| 2017/0317632 A1 | 11/2017 | Lai |
| 2018/0001735 A1 | 1/2018 | Chuang |
| 2018/0011629 A1 | 1/2018 | Ding |
| 2018/0029440 A1 | 2/2018 | Cheng |
| 2018/0043747 A1 | 2/2018 | Cheng |
| 2018/0067634 A1 | 3/2018 | Dai |
| 2018/0079277 A1 | 3/2018 | Hsiao et al. |
| 2018/0083563 A1 | 3/2018 | Lai |
| 2018/0091082 A1 | 3/2018 | Lai |
| 2018/0126818 A1 | 5/2018 | Chen et al. |
| 2018/0126864 A1 | 5/2018 | Dai |
| 2018/0138846 A9 | 5/2018 | Lai |
| 2018/0147912 A1 | 5/2018 | Cheng |
| 2018/0201231 A1 | 7/2018 | Tani et al. |
| 2018/0205338 A1 | 7/2018 | Lai |
| 2018/0212293 A1 | 7/2018 | Ho |
| 2018/0226910 A1 | 8/2018 | Lai |
| 2019/0077376 A1 | 3/2019 | Baldovino et al. |
| 2019/0310470 A1* | 10/2019 | Weindorf .................. B60S 1/56 |
| 2019/0322245 A1* | 10/2019 | Kline .................... B60S 1/0848 |
| 2020/0057301 A1 | 2/2020 | Kuratani et al. |
| 2020/0139939 A1 | 5/2020 | Kubota et al. |
| 2020/0174156 A1* | 6/2020 | Terefe ..................... G01S 17/95 |
| 2020/0391702 A1* | 12/2020 | Yamauchi ................ B60Q 9/00 |
| 2021/0132372 A1 | 5/2021 | Kuratani et al. |

FOREIGN PATENT DOCUMENTS

| | | |
|---|---|---|
| JP | 2015216463 A | 12/2015 |
| JP | 2018114853 A | 7/2018 |
| WO | 2018198465 A1 | 11/2018 |
| WO | 2018/230558 A1 | 12/2018 |

OTHER PUBLICATIONS

Written Opinion (PCT/ISA/237) dated Aug. 4, 2020 issued by the International Searching Authority in International Application No. PCT/JP2020/022569.

International Search Report (PCT/ISA/210) dated Aug. 4, 2020 issued by the International Searching Authority in International Application No. PCT/JP2020/022569.

\* cited by examiner

VEHICLE SENSOR CLEANING SYSTEMS

TECHNICAL FIELD

The present invention relates to a vehicular cleaner system and t sensor system equipped with a vehicular cleaner.

BACKGROUND ART

In recent years, the number of vehicles equipped with an in-vehicle camera to shoot vehicle surroundings is increasing. The in-vehicle camera outputs acquired information to a vehicular ECU or the like that controls a host vehicle. A lens of the in-vehicle camera, which is an imaging surface, may become dirty due to a raindrop, mud, or the like. Known in the related art such as Patent Literature 1 is a device for removing a foreign object by ejecting cleaning liquid, compressed air, and the like to the lens of the in-vehicle camera in order to remove a foreign object, such as a drop of water, adhering to the lens.

CITATION LIST

Patent Literature

Patent Literature 1: JP2001-171491A

SUMMARY OF INVENTION

Technical Problem

In the vehicular cleaner disclosed in Patent Literature 1, a cleaning method needs to be improved in a case in which the same cleaning object is cleaned for a plurality of times.

A plurality or cameras or sensors can be mounted on a vehicle. It conceivable that vehicular cleaners mentioned above clean the plurality of cameras or sensors. As a result, power consumption of the vehicular cleaners increases.

An object of the present invention is to provide a vehicular cleaner system that can achieve an effective cleaning method when the same cleaning object is cleaned fort plurality of times.

Further, another object of the present invention is to provide a sensor system equipped with a vehicular cleaner that can reduce power consumption.

Solution to Problem

In order to achieve at least one of the above objects, a vehicular cleaner system according to an aspect of the present invention is a system for cleaning a cleaning object mounted on a vehicle, the vehicular cleaner system includes:
 a cleaner configured to eject cleaning medium toward the cleaning object; and
 a control unit configured to operate the cleaner, in which,
 when the cleaner is operated again within a predetermined time after the control unit operated the cleaner in a first mode in response to an operation signal, the control unit operates the cleaner in a second mode different from the first mode.

According to the above configuration, when the same cleaning object is cleaned for a plurality of times, effective cleaning can be performed by changing a cleaning mode (cleaning method).

A vehicular cleaner system according to another aspect of the present invention is a system for cleaning a cleaning object mounted on a vehicle, the vehicular cleaner system includes:
 a cleaner configured to eject cleaning medium toward the cleaning object; and
 a control unit configured to operate the cleaner in accordance with a foreign object adhering to the cleaning object, in which,
 when it is determined that the foreign object has not been removed after the control unit operated the cleaner in a first mode, the control unit operates the cleaner in a second mode different from the first mode.

According to the above configuration, when the foreign object adhering to the cleaning object cannot be removed even after cleaning, effective cleaning (removal of foreign object) can be performed by changing a cleaning mode.

A sensor system equipped with a vehicular cleaner according to another aspect of the present invention includes:
 a sensor configured to operate in a normal mode and a standby mode;
 a cleaner unit configured to clean the sensor in response to an operation signal output in accordance with a dirt determination result of the sensor; and
 a control unit configured to control the sensor and the cleaner unit, in which
 the sensor is configured to operate in the normal mode, in which the sensor is operated at a predetermined cycle, and in the standby mode, in which the sensor is operated at a cycle longer than in the normal mode.
 the cleaner unit is configured to operate in a regular mode in which the cleaner unit operates in response to the operation signal and to operate in a block mode in which the cleaner unit does not operate even when the operation signal is input,
 the control unit includes:
  a fixed dirt determination unit configured to determine whether dirt on the sensor can be removed by cleaning by the cleaner unit;
  a first mode-switching unit configured to switch the sensor from the normal mode to the standby mode when the fixed dirt determination unit determines that the dirt on the sensor cannot be removed;
  a sensor restoration determination unit configured to determine whether the dirt has been removed based on a sensor output acquired in the standby mode when the sensor was operated in the standby mode; and
  a second mode-switching unit configured to switch the sensor back from the standby mode to the normal mode when the sensor restoration determination unit determines that the dirt on the sensor has been removed, and
 the control unit is configured to operate the cleaner unit in the regular mode when the sensor is in the normal mode and to operate the cleaner unit in the block mode when the sensor is in the standby mode.

A sensor system equipped with a vehicular cleaner according to another aspect of the present invention includes:
 a sensor mounted on a vehicle;
 a cleaner unit configured to clean the sensor in response to an operation signal output in accordance with a dirt determination result of the sensor; and a cleaner control unit configured to control the cleaner unit, in which the cleaner unit is configured to operate in a regular mode in which the cleaner unit operates in response to the operation signal and to operate in a block mode in which the cleaner unit does not operate even when the operation signal is input, the cleaner control unit includes:
- a fixed dirt determination unit configured to determine whether dirt on the sensor can be removed by cleaning by the cleaner unit;
- a first mode-switching unit configured to switch the cleaner unit from the regular mode to the block mode when the fixed dirt determination unit determines that the dirt on the sensor cannot be removed,
- a condition change determination unit configured to determine whether at least one of the following predetermined conditions is satisfied;
  - a predetermined time has passed since the first mode-switching unit switched the cleaner unit to the block mode;
  - weather has changed after the first mode-switching unit switched the cleaner unit to the block mode;
  - a temperature has changed by more than a predetermined value after the first mode-switching unit switched the cleaner unit to the block mode;
  - a vehicle speed has changed by more than a predetermined value after the first mode-switching unit switched the cleaner unit to the block mode; or
  - mileage has increased by more than a predetermined value since the first mode-switching unit switched the cleaner unit to the block mode; and
- a second mode-switching unit configured to switch the cleaner unit from the block mode to the regular mode when the condition change determination unit determines that the at least one of the predetermined conditions is satisfied.

A sensor system equipped with a vehicular cleaner according to another aspect of the present invention includes:
- a sensor mounted on a vehicle;
- a cleaner unit configured to clean the sensor in response to an operation signal output in accordance with a dirt determination result of the sensor; and
- a cleaner control unit configured to control the cleaner unit, in which the cleaner unit is configured to operate in a regular mode in which the cleaner unit operates in response to the operation signal and to operate in a block mode in which the cleaner unit does not operate even when the operation signal is input, the cleaner control unit includes:
- a fixed dirt determination unit configured to determine whether dirt on the sensor can be removed by cleaning by the cleaner unit;
- a first mode-switching unit configured to switch the cleaner unit from the regular mode to the block mode when the fixed dirt determination writ determines that the dirt on the sensor cannot be removed;
- a condition change determination unit configured to determine whether at least one of the following predetermined conditions are satisfied:
  - a predetermined time has passed since the first mode-switching unit switched the cleaner unit to the block mode;
  - weather has changed after the first mode-switching unit switched the cleaner unit to the block mode;
  - a temperature has changed by more than a predetermined value after the first mode-switching unit switched the cleaner unit to the block mode,
  - a vehicle speed has changed by more than a predetermined value after the first mode-switching unit switched the cleaner unit to the block mode; or
  - mileage has increased by more than a predetermined value since the first mode-switching unit switched the cleaner unit to the block mode; and
- a second mode-switching unit configured to switch the cleaner unit to a test mode in which it is determined whether the dirt on the sensor has been removed after the cleaner unit operated for more than a predetermined number of times, and the second mode-switching unit is configured to switch the cleaner unit to the regular mode when it is determined that the dirt on the sensor has been removed in the test mode and to switch the cleaner unit to the block mode when it is determined that the dirt on the sensor has not been removed in the test mode.

Advantageous Effects of Invention

According to the present invention, it is possible to provide a vehicular cleaner system that can achieve an effective cleaning method when the same cleaning object is cleaned for a plurality of times.

Further, according to the present invention, it is possible to provide a sensor system equipped with a vehicular cleaner that can reduce power consumption.

DESCRIPTION OF EMBODIMENTS

Figure 1:
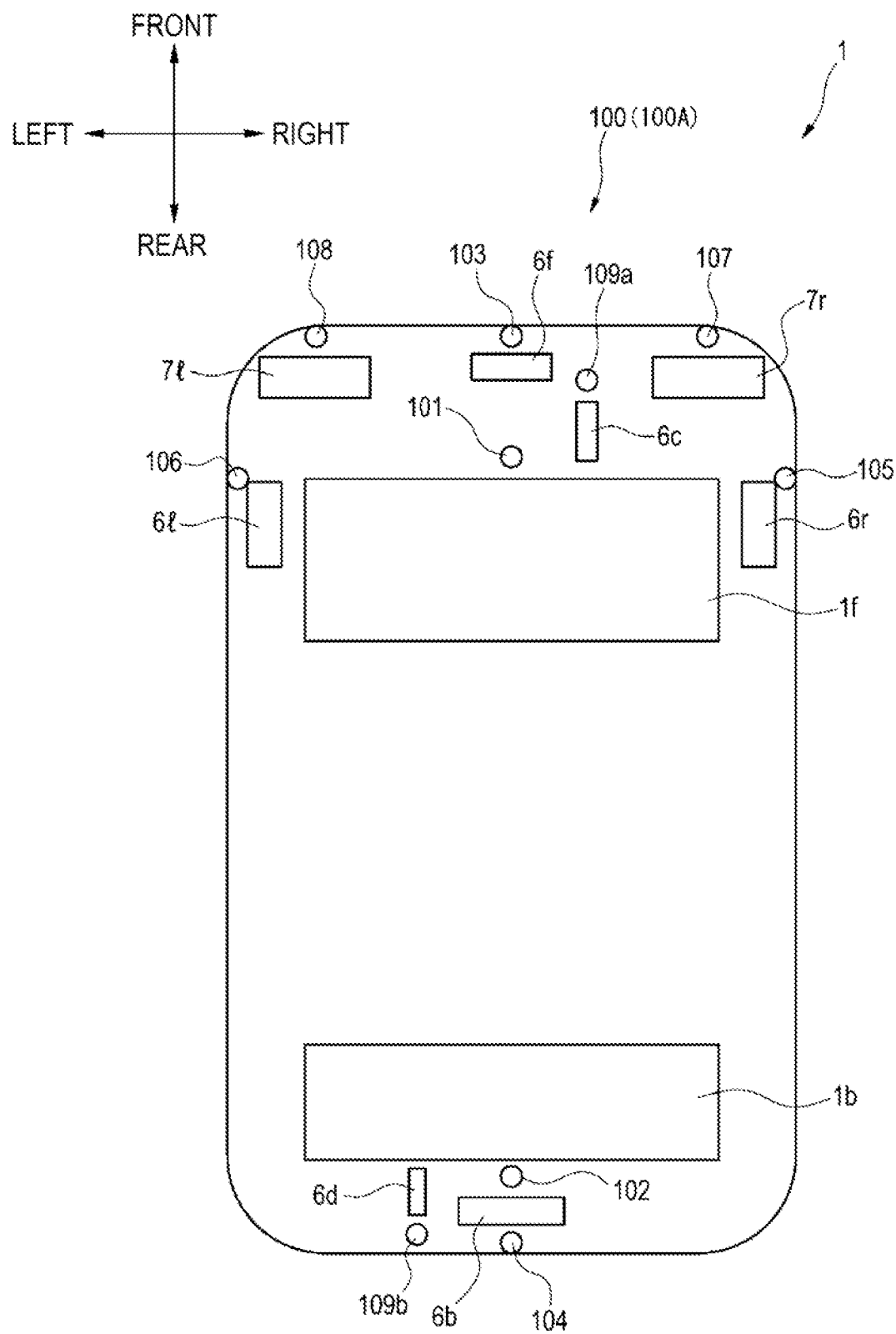
FIG. 1 is a top view showing a vehicle equipped with a vehicular cleaner system according to a first embodiment and a sensor system according to a second embodiment.

In the following, embodiments of the present invention will be described with reference to the drawings. Components having the same reference numerals as those already described in the description of embodiments will be omitted for the sake of simplicity. Dimensions of components in the drawings may be different from actual dimensions for the sake of convenience.

In the description of embodiments, a "left-right direction," a "front-rear direction," and an "tapper lower direction" are will be referred to for the sake of convenience. These directions are relative directions set for a vehicle 1 of FIG. 1. The "upper-lower direction" includes an "upper direction" and a "lower direction," The "front-rear direction" includes a "front direction" and a "rear direction." The "left-right direction" includes a "left direction" and a "right direction."

First Embodiment

FIG. 1 is a top view showing a vehicle 1 equipped with a vehicular cleaner system 100 (hereinafter, referred to as a cleaner system 100) according to a first embodiment. The vehicle 1 includes the cleaner system 100. In the present embodiment, the vehicle 1 can travel in self-driving mode.

Figure 2:
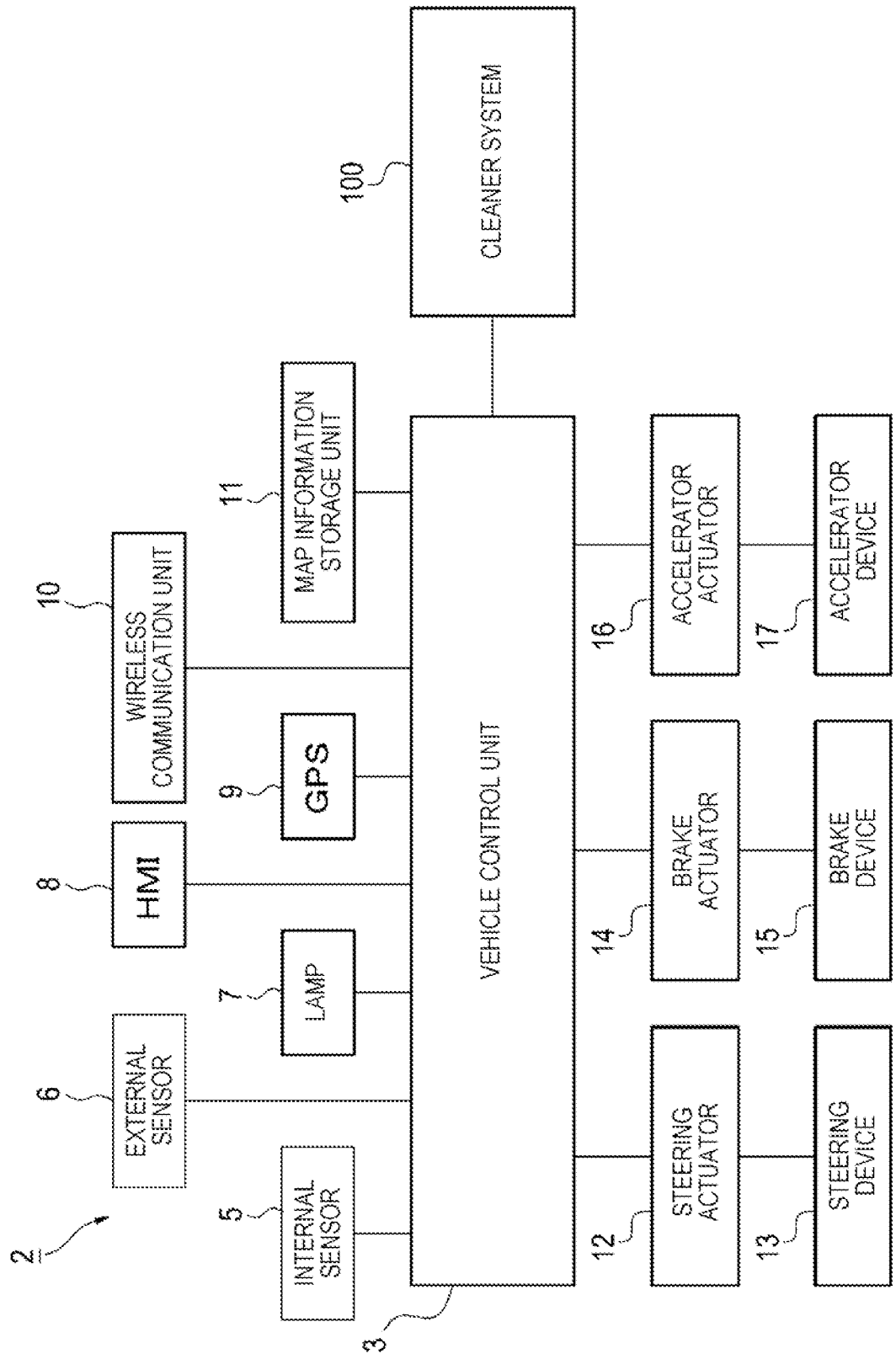
FIG. 2 is a block diagram showing a vehicle system according to the first embodiment.

First, a vehicle system 2 of the vehicle 1 will be described with reference to FIG. 2. FIG. 2 is a block diagram showing the vehicle system 2. As shown in FIG. 2, the vehicle system 2 includes: a vehicle control unit 3; an internal sensor 5; an external sensor 6; a lamp 7; a human machine interface (HMI) 8; a global positioning system (GPS) 9; a wireless communication unit 10; and a map information storage unit 11. The vehicle system 2 further includes: a steering actuator 12; a steering device 13; a brake actuator 14; a brake device 15; an accelerator actuator 16; and an accelerator device 17.

The vehicle control unit 3 is configured with am electronic control unit (ECU). The vehicle control unit 3 includes: a processor, such as a central processing unit (CPU); a read-only memory (ROM) storing various vehicle control programs; and a random-access memory (RAM) temporarily storing various vehicle control data. The processor is configured to load a program designated by a vehicle control program stored in the ROM onto the RAM to execute a variety of processing in cooperation with the RAM. The vehicle control unit 3 is configured to control traveling of the vehicle 1.

The internal sensor 5 is configured to acquire information about a host vehicle. The internal sensor 5 is, for example, at least one of an accelerometer, a (vehicle) speed sensor, a wheel speed sensor, and a gyroscope. The internal sensor 5 is configured to acquire information about the host vehicle including a traveling state of the vehicle 1 to output the information to the vehicle control unit 3. The internal sensor 5 may include: a seat occupancy sensor configured to detect whether a driver sits an a driver seat; a face orientation sensor configured to detect an orientation of the driver's face; a motion detector configured to detect whether there is a person in the vehicle, a dirt detection sensor configured to detect whether a foreign object adheres to the external sensor 6; and the like.

The external sensor 6 is configured to acquire information about the outside of the host vehicle. The external sensor is, for example, at least one of a camera, a radar, a LiDAR, and the like. The external sensor 6 is configured to acquire information about the outside of the host vehicle including surroundings (another vehicle, a pedestrian, a road shape, a traffic sign, an obstacle, and the like) of the vehicle 1 to output the information to the vehicle control unit 3. The external sensor 6 may include: a weather sensor (for example, a rain sensor, a hygrometer, a thermometer, and the like) configured to detect weather conditions; an illuminance sensor configured to detect illuminance around the vehicle 1; or the like.

The camera includes, for example, an image sensor, such as a charge-coupled device (CCD) and a complementary metal-oxide-semiconductor (CMOS) and is configured to detect visible light or infrared light.

The radar is a millimeter-wave radar, a microwave radar, a laser radar, or the like.

LiDAR stands for "light detection and ranging" or "laser imaging detection and ranging." In general, LiDAR is a sensor configured to emit invisible light ahead and acquire information, such as a distance to an object, a shape of the object a material of the object, and a color of the object, based on the emitted light and returned light.

The lamp 7 is at least one of: a headlamp or a position lamp, which are provided at the front of the vehicle 1; a rear combination lamp, which is provided at the rear of the vehicle 1; a turn signal lamp, which is provided at the front or the side of the vehicle; a lamp for conveying a state of the host vehicle to a pedestrian or a driver of another vehicle; and the like.

The HMI 8 includes: an input unit configured to receive an input operation from the driver; and an output unit configured to output traveling information or the like to the driver. The input unit includes: a steering wheel; an accelerator pedal; a brake pedal; a driving-mode selecting switch for switching driving modes of the vehicle 1; and the like. The output unit is a display configured to display a variety of traveling information.

The GPS 9 is configured to acquire current location information of the vehicle 1 to output the acquired current location information to the vehicle control unit 3. The wireless communication unit 10 is configured to receive traveling information of another vehicle around the vehicle 1 from the another vehicle and to transmit traveling information of the vehicle 1 to the another vehicle (vehicle-to-vehicle communication). The wireless communication 10 is configured to receive infrastructure in formation from an infrastructure facility, such as traffic lights and a traffic sign, and to transmit traveling information of the vehicle 1 to the infrastructure facility (vehicle-to-infrastructure communication). The map information storage unit 11 is an external storage device, such as a hard disk drive, configured to store map information and is configured to output the map information to the vehicle control unit 3.

When the vehicle 1 travels in self-driving mode, the vehicle control unit 3 automatically generates, based on the traveling state information, the surrounding information, the current position information, the map information, and the like, at least one of a steering control signal, an accelerator control signal, and a brake control signal. The steering actuator 12 is configured to receive the steering control signal from the vehicle control unit 3 to control the steering device 13 based on the received steering control signal. The brake actuator 14 is configured to receive the brake control signal from the vehicle control unit 3 to control the brake device 15 based on the received brake control signal. The accelerator actuator 16 is configured to receive the accelerator control signal from the vehicle control unit 3 to control the accelerator device 17 based on the received accelerator control signal. In this way, traveling of the vehicle 1 is automatically controlled by the vehicle system 2 in the self-driving mode.

On the other hand, when the vehicle 1 travels in manual driving mode, the vehicle control unit 3 generates the steering control signal, the accelerator control signal, and the brake control signal in accordance with the driver's manual operation OD the accelerator pedal, the brake pedal, and the steering wheel. In this way, since the steering control signal, the accelerator control signal, and the brake control signal are generated by the driver's manual operation in the manual driving mode, the traveling of the vehicle 1 is controlled by the driver.

Next, driving modes or the vehicle 1 will be described. The driving modes includes self-driving mode and manual driving mode. The self-driving mode includes full automation mode advanced driver assistance mode, and a driver assistance mode. In the full automation mode, the vehicle system 2 automatically performs all of steering control, brake control, and accelerator control, and the driver cannot drive the vehicle 1. In the advanced driver assistance mode, the vehicle system 2 automatically performs all of the steering control, the brake control, and the accelerator control, and the driver can but does not drive the vehicle 1. In the driver assistance mode, the vehicle system 2 automatically performs some of the steering control, the brake control, and the accelerator control, and the driver drives the vehicle 1 with driving assistance of the vehicle system 2. On the other hand, in the manual driving mode, the vehicle system 2 does not automatically perform traveling control, and the driver drives the vehicle 1 without the driving assistance of the vehicle system 2.

The driving modes of the vehicle 1 may be switched by operating the driving-mode selecting switch. In this case, the vehicle control unit 3 switches the driving modes of the vehicle 1 among four driving modes (the full automation mode, the advanced driver assistance mode, the driver assistance mode, and the manual driving mode) in accordance with the driver's operation on the driving-mode selecting switch. The driving modes of the vehicle 1 may be automatically switched based on information indicating a traveling-permitted section in which a self-driving car is permitted to travel or a traveling-prohibited section in which a self-driving car is prohibited from traveling or based on information about weather conditions of the outside. In this case, the vehicle control unit 3 switches the driving modes of the vehicle 1 based on the information described above. In addition, the driving, modes of the vehicle 1 may be automatically switched using the seat occupancy sensor, the face orientation sensor, or the like. In this case, the vehicle control unit 3 switches the driving modes of the vehicle 1 based on an output signal from the seat occupancy sensor or the face orientation sensor.

The vehicle 1 of FIG. 1 includes, as the external sensor 6, a front LiDAR 6f, a rear LiDAR 6b, a right LIDAR 6r a left LiDAR 6l, a front camera 6c, and a rear camera 6d. The front LiDAR 6f is configured to acquire information about the front side of the vehicle 1. The rear LiDAR 6b is configured to acquire information about the rear side of the vehicle 1. The right LIDAR 6r or is configured to acquire information about the right side of the vehicle 1. The left LiDAR, 6l is configured to acquire information about the left side of the vehicle 1. The front camera 6c is configured to acquire information about the front side of the vehicle 1. The rear camera 6d is configured to acquire information about the rear side of the vehicle 1.

Although the front LiDAR 6f is provided at the front of the vehicle 1, the rear LiDAR 6b is provided at the rear of the vehicle 1, the right LiDAR 6r is provided at the right of the vehicle 1, and the left LiDAR 6l is provided at the left of the vehicle 1 in the example of FIG. 1, the present invention is not limited thereto. For example, the front LiDAR, the rear LiDAR, the right LiDAR, and the left LiDAR may be disposed together at a roof of the vehicle 1.

The vehicle 1 includes, as the lamp 7, a right headlamp 7r and a left headlamp 7l. The right headlamp 7r is provided in the right of the front of the vehicle 1, and the left headlamp 11 is provided in the left of the front of the vehicle 1. The right headlamp 7r is provided to the right of the left headlamp 7l.

The vehicle 1 includes a front window 1f and a rear window 1b.

The vehicle 1 includes the cleaner system 100 according to an embodiment of the present invention. The cleaner system 100 is a system to remove a foreign object, such as a drop of water, ice (snow), mud, and dust, adhering to a cleaning object or to prevent a foreign object from adhering to the cleaning object.

In the present embodiment, the cleaner system 100 includes: a front window washer unit (hereinafter, referred to as a front WW) 101 configured to clean the front window 1f; and a rear window washer unit (hereinafter, referred to as a rear WW) 102 configured to clean the rear window 1b.

The cleaner system 100 further includes: a front LiDAR cleaner trait (hereinafter, referred to as a front LC) 103 configured to clean the front LiDAR 6f; and a rear LiDAR cleaner unit (hereinafter, referred to as a rear LC) 104 configured to clean the rear LiDAR 6b.

The cleaner system 100 further includes: a right LiDAR cleaner unit (hereinafter, referred to as a right LC) 105 configured to clean the right LiDAR 6r, and a left LiDAR cleaner unit (hereinafter, referred to as a left LC) 106 configured to clean the left LIDAR 6l.

The cleaner system 100 further includes: a right headlamp cleaner unit (hereinafter, referred to as a right RC) 107 configured to clean the right headlamp 7r; and a left headlamp cleaner unit (hereinafter, referred to as a left HC) 108 configured to clean the left headlamp 71. The cleaner system 100 further includes: a front camera cleaner unit 109a configured to clean the front camera 6c; and a rear camera cleaner unit 109b configured to clean the rear camera 6d. Each of the cleaners 101 to 109b includes one or more nozzles and is configured to elect a cleaning medium, such as cleaning liquid, water, and air, from the nozzles toward the cleaning object.

Figure 3:
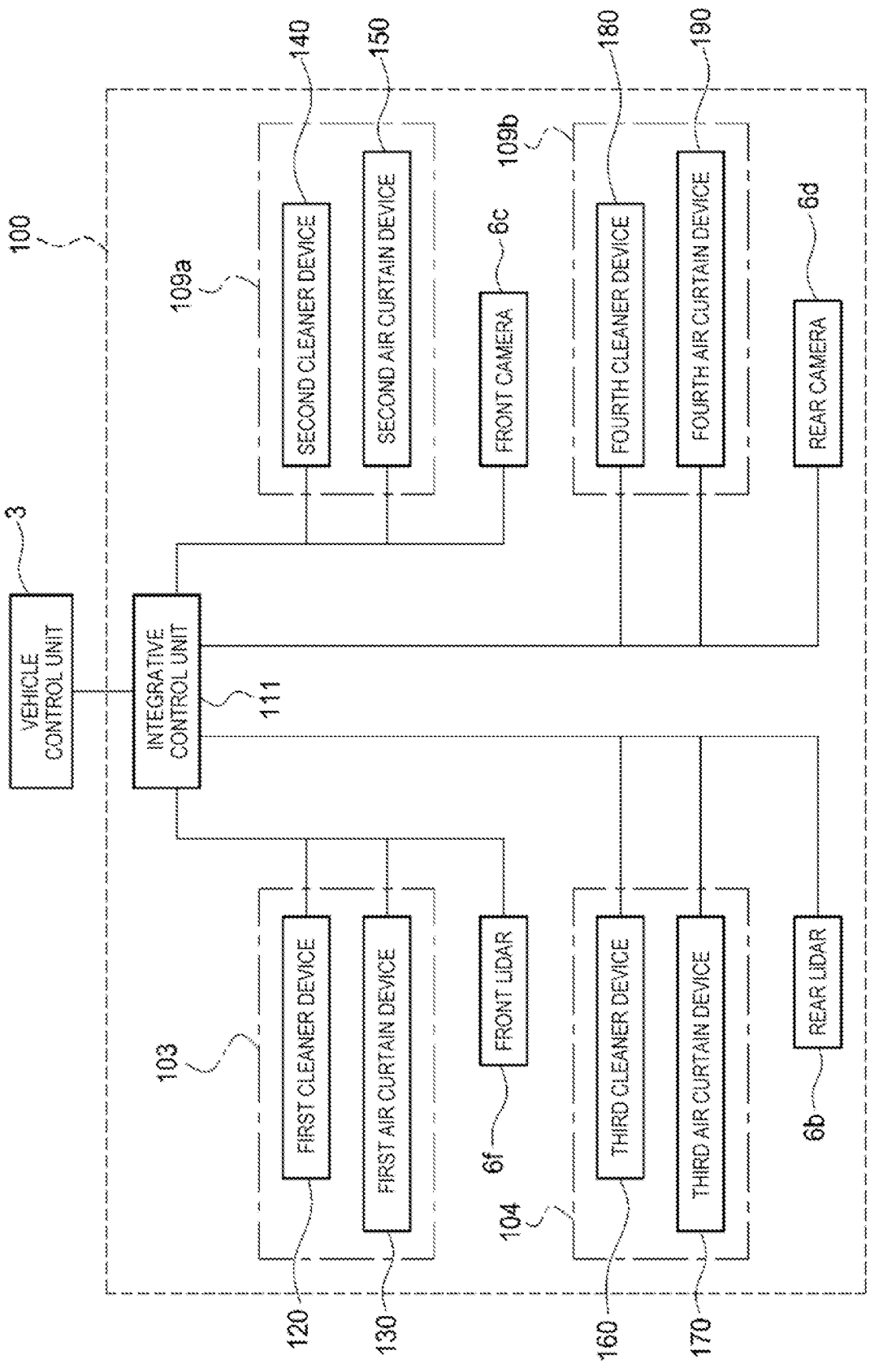
FIG. 3 is a block diagram showing the vehicular cleaner system according to the first embodiment.

FIG. 3 is a block diagram showing the cleaner system 100. The cleaner system 100 includes: the cleaners 101 to 109b described above; and an integrative control unit 111 configured to control the cleaners 101 to 109b. In FIG. 3, the front LC 103, the front camera cleaner unit 109a, the rear LC 104, and the rear camera cleaner unit 109b out of the cleaners 101 to 109b described above are shown, and the front WW 101, the rear WW 102, the right LC 105, the left LC 106 the right HC 107, and the left. HC 108 are not shown.

The front LC 103 includes: a first cleaner device 120 (an example of a cleaner) configured to remove a foreign object adhering, to the front LiDAR 6f; and a first air curtain device 130 configured to prevent a foreign object from adhering to the front LiDAR 6f.

The front camera cleaner unit 109a includes: a second cleaner device 140 (an example of the cleaner) configured to remove a foreign object adhering to the front camera 6c; and a second air curtain device 150 configured to prevent a foreign object from adhering to the front camera 6c.

The rear LC 104 includes: a third cleaner device 160 (an example of the cleaner) configured to remove a foreign object adhering to the rear LiDAR 6b; and a third air curtain device 170 configured to prevent a foreign object from adhering to the rear LiDAR 6b.

The rear camera cleaner unit 109b includes: a fourth cleaner device 180 (an example of the cleaner) configured to remove a foreign object adhering to the rear camera 6d; and a fourth air curtain device 190 configured to prevent a foreign object from adhering to the rear camera 6d.

An air curtain device is configured to produce an air curtain that prevents a foreign object from adhering, to a cleaning object by continuously blowing air at a predetermined wind speed or a predetermined air flow rate to the cleaning object, such as an in-vehicle sensor and a vehicle lamp, to cause a constant air flow to flow constantly on a surface of the cleaning object.

Each of the cleaner devices 120, 140, 160, and 180 is provided with a cleaner control unit (not shown). Each of the air curtain devices 130, 150, 170, and 190 is provided with an air curtain control unit (not shown). The cleaner control units and the air curtain control units are electrically connected to the integrative control unit 111. The cleaner control units and the air curtain control units control operation of the cleaner devices 120, 140, 160, and 180 and the air curtain devices 130, 150, 170, and 190 based on signals from the integrative control unit 111. The integrative control unit 111 is electrically connected to the vehicle control unit 3.

Although the cleaner control units, the air curtain control units, and the integrative control unit 111 are provided as separate components in the present embodiment, these control units may be integrated. In this case, the cleaner control units, the air curtain control units, and the integrative control unit 111 may be configured with a single electronic control unit. Although the vehicle control unit 3 and the integrative control unit 111 are provided as separate components in the present embodiment, the vehicle control unit 3 and the integrative control unit 111 may be integrated. In this case, the vehicle control unit 3 and the integrative control unit 111 may be configured with a single electronic control unit.

The cleaner system 100 shown in FIG. 3 is equipped with sensors including various external sensors, such as the front LiDAR 6f and the front camera 6c. The cleaner system 100 may include: a cleaner device configured to remove a foreign object adhering to a sensor (not shown), such as a side camera configured to acquire an image of the side of the vehicle 1; or an air curtain device configured to prevent a foreign object from adhering to the sensor.

Next, with reference to FIGS. 4 to 7, the cleaning objects, the cleaner devices configured to eject cleaning liquid toward the cleaning objects, and the air curtain devices configured to eject air (wind) toward the cleaning objects will be described in detail.

Figure 4:
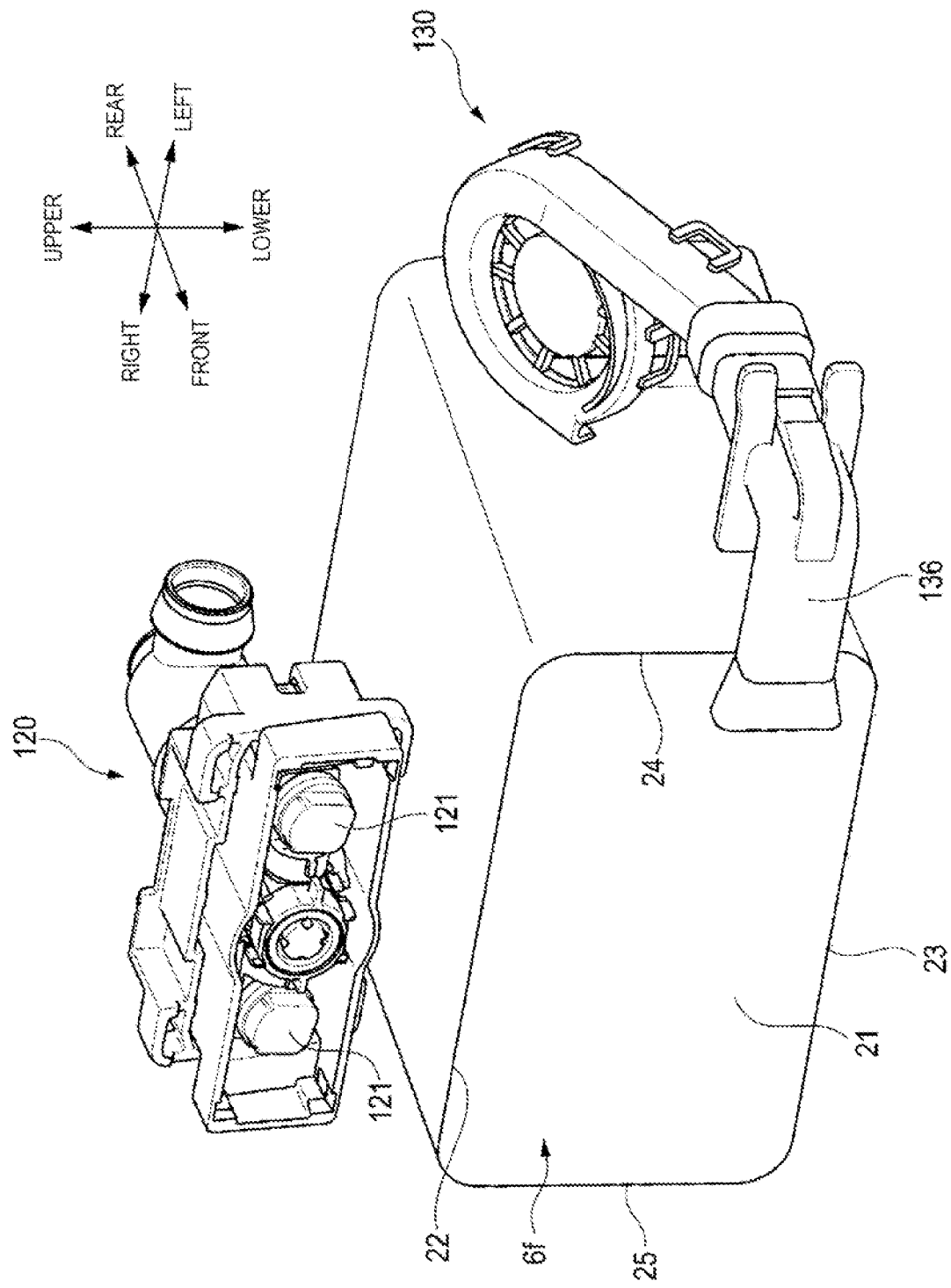
FIG. 4 is a perspective view showing an example of a cleaning object, a cleaner device, and an air curtain device.

FIG. 4 shows: the front LiDAR 6f, which is an example of the cleaning objects; the first cleaner device 120 configured to eject cleaning liquid to the front LiDAR 6f; and the first air curtain device 130 configured to eject air to the front LiDAR 6f.

The cleaning surface 21 of the front LiDAR 6f, which is a cleaning object, is formed into, for example, a rectangular shape (a long sideways rectangular shape in the present example). The first cleaner device 120 is configured to spray the cleaning liquid toward the cleaning surface 21 of the front LiDAR 6f from a liquid nozzle 121. The first air curtain device 130 is configured to blow air to the cleaning surface 21 of the front LiDAR 6f from an air nozzle 136. The cleaning surface 21 is a detection surface of the front LiDAR 6f.

The liquid nozzle 121 of the first cleaner device 120 is disposed facing the upper side 22 of the cleaning surface 21 of the front LiDAR 6f. That is, the liquid nozzle 121 is preferably disposed facing the long side of the long sideways rectangle of the cleaning surface 21. Although the liquid nozzle 121 may be disposed facing the lower side 23 of the cleaning surface 21, water, mud, or the like may enter an opening of the liquid nozzle 121 in this case. Thus, the liquid nozzle 121 is preferably disposed facing the upper side 22.

The air nozzle 136 of the first air curtain device 130 is disposed facing the left side 24, which is perpendicular to the upper side 22 of the cleaning surface 21 of the front LiDAR 6f. That is, the air nozzle 136 is preferably disposed facing the short side of the long sideways rectangle of the cleaning surface 21. The air nozzle 136 may be disposed acing the right side 25 of the cleaning surface 21.

Since configurations of other cleaning objects and a cleaner device and an air curtain device for each of those cleaning objects are the same as those in FIG. 4, description thereof will be omitted. Those cleaning objects includes: the rear LiDAR 6b, the right LiDAR 6r, the left LiDAR 6l, the front camera 6c, and the rear camera 6d, which are external sensors; the right headlamp 7r and the left headlamp 7l, which are vehicle lamps; the front window 1f; the rear window 1b; and the like.

Figure 5:
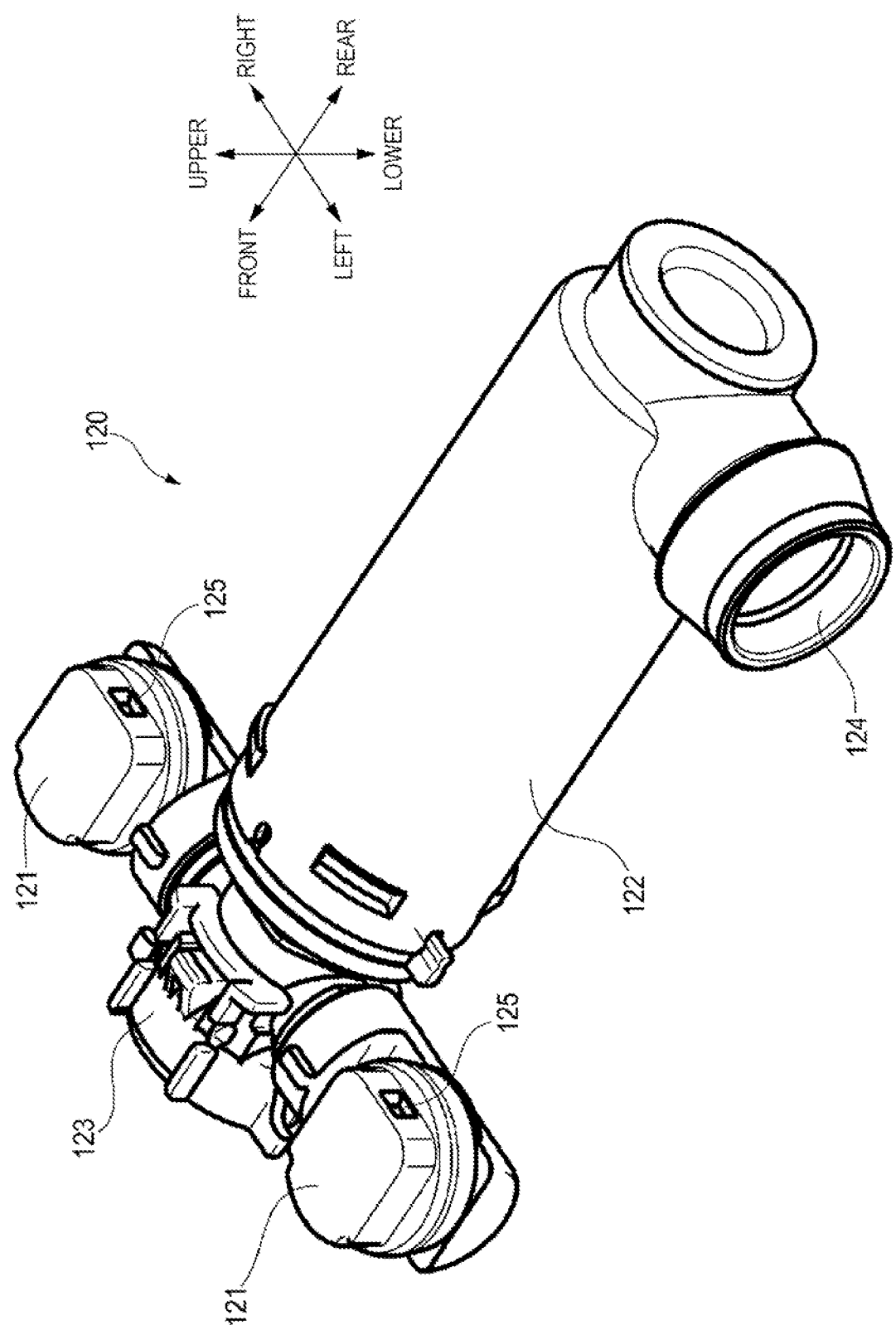
FIG. 5 is a perspective view showing the cleaner device of FIG. 4.

FIG. 5 is a perspective view showing the first cleaner device 120. As shown in FIG. 5, the first cleaner device 120 includes: a cylinder 122; a piston 121, and a pair of liquid nozzles 121 and 121.

The cylinder 122 is formed into a cylindrical shape, and a coupling portion 124 is provided in the rear. A hose for supplying the cleaning liquid is connected to the coupling portion 124. The hose is also connected to a cleaning liquid tank (not shown) configured to store the cleaning liquid. When the hose is connected to the coupling portion 124, the cleaning liquid is supplied from the cleaning liquid tank into the cylinder 122.

The piston 123 is slidably accommodated in the cylinder 122, which has a cylindrical shape. The piston 123 can move forward and backward in a front-rear direction along an axis of the cylinder 122.

The pair of left and right liquid nozzles 121 and 121 are provided around a tip of the piston 123. The liquid nozzles 121 and 121 are each provided with an ejection port 125 for ejecting the cleaning liquid. The liquid nozzles 121 and 121 are configured to eject the cleaning liquid from the ejection ports 125 toward the cleaning surface 21 of the front LiDAR 6f. Since the pair of liquid nozzles 121 and 121 are similar, the left liquid nozzle 121 will be described in the following.

The liquid nozzle 121 is a fluidic nozzle (fluidic oscillating nozzle). A fluidic nozzle is a nozzle configured to change an ejection direction of a fluid by causing the fluid flowing inside the nozzle to interfere. Since the liquid nozzle 121 is a fluidic nozzle, it is possible to eject the cleaning liquid at high pressure toward a wide range of the cleaning surface 21 of the front LiDAR 6f. The liquid nozzle 121 may eject the cleaning liquid from the ejection port 125 without changing the ejection direction of the cleaning liquid.

Figure 6:
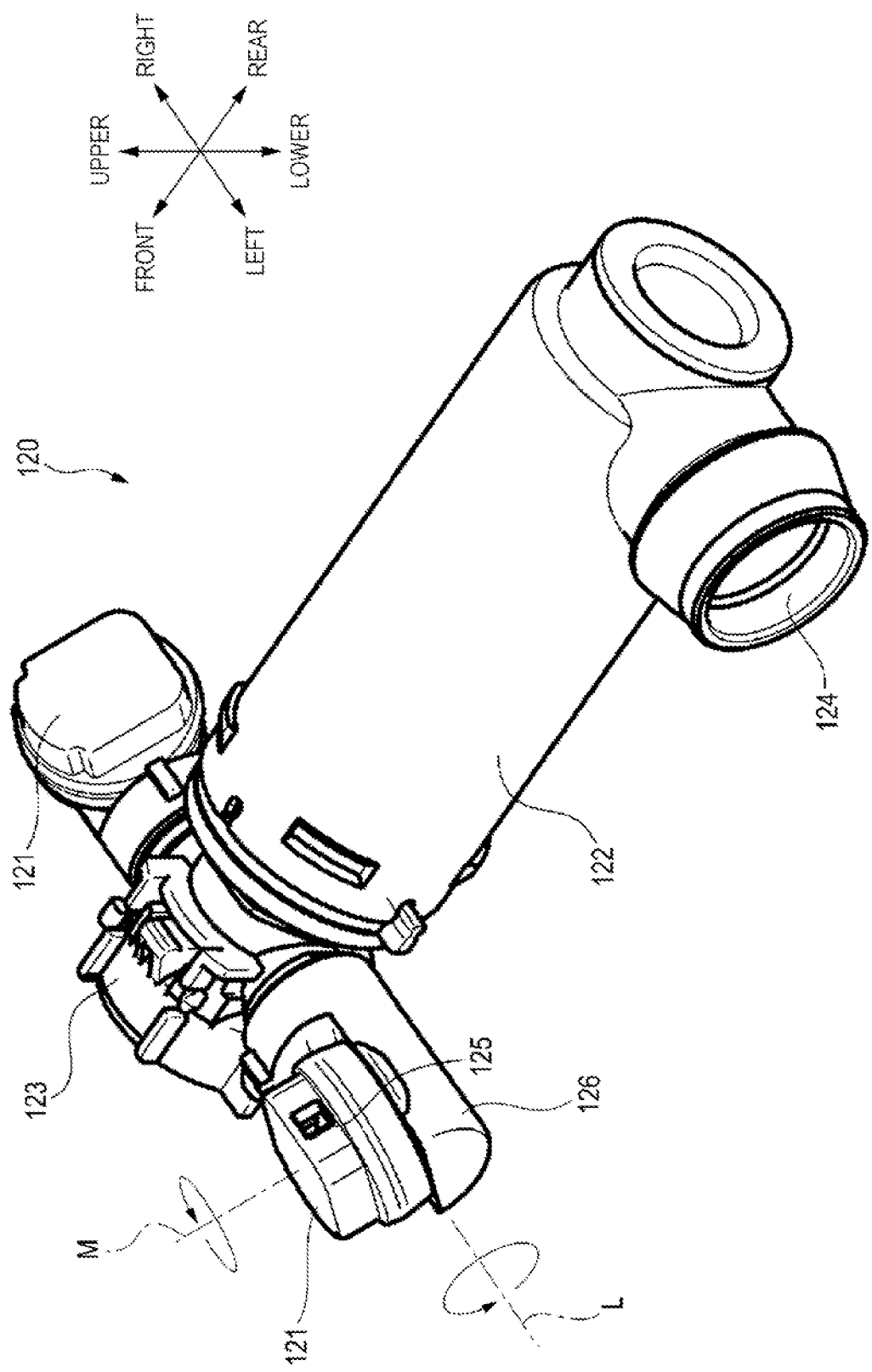
FIG. 6 is a view showing rotation of liquid noes of the cleaner device of FIG. 4.

FIG. 6 is a view showing, rotation of the liquid nozzles 121 in the first cleaner device 120. As shown in FIG. 6, the liquid nozzles 121 are attached to nozzle holders 126. The nozzle holders 126 are attached to the piston 123 being rotatable around an axis L extending in a left—right direction of the piston 123. The liquid nozzles 121 are attached to the nozzle holders 126 being rotatable around an axis M perpendicular to the axis L. If the liquid nozzles 121 and the nozzle holders 126 are appropriately rotated, the ejection ports 125 of the liquid nozzles 121 can be aimed at appropriate positions in accordance with a relative position of the liquid nozzles 121 to the front LiDAR 6f. Accordingly, it is possible to adjust positions of the liquid nozzles 121 to cause the cleaning liquid to hit the front LiDAR 6f appropriately.

The liquid nozzle 121 may be provided at only one side around the tip of the piston 123. Three or more liquid nozzles 121 may be provided along the upper side 22 of the cleaning surface 21. Alternatively, one liquid nozzle 121 may be provided at the tip of the piston 123. In this case, it is preferable for the liquid nozzle 121 to include a wide ejection port correspondingly to the long sideways rectangle of the cleaning surface 21, if a plurality of ejection ports or a wide ejection port is provided, the cleaning liquid can spread to long sideways rectangle of the cleaning surface, such as the cleaning surface 21.

Figure 7:
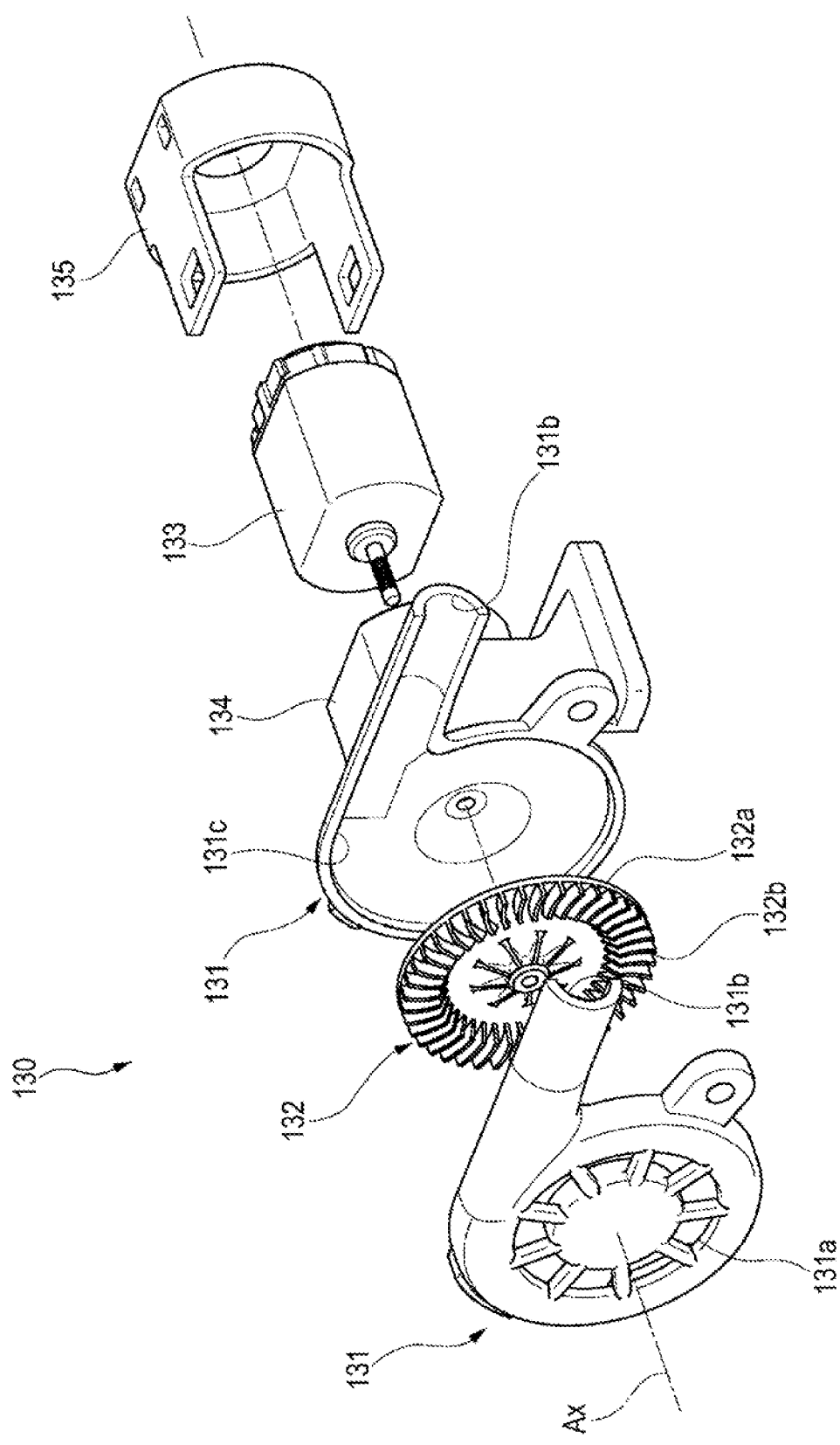
FIG. 7 is an exploded perspective view showing the air curtain device of FIG. 4.

FIG. 7 is an exploded perspective view showing the first air curtain device 130. As shown in FIG. 7, the first air curtain device 130 includes: a housing 131; an impeller 132; an air curtain motor 133; a frame 134; and a motor case 135.

The impeller 132 is rotatable around a rotation axis Ax by the air curtain motor 133. The impeller 132 includes a disk-shaped plate 132a and a plurality of blades 132b. The blades 132b is provided extending in a radial direction of the impeller 132 and forming an annular shape on the plate 132a.

The housing 131 covers the impeller 132. The housing 131 is divided into two sides along the rotation axis Ax of the impeller 132. The housing 131 embraces a doughnut-shaped internal space, in which the impeller 132 is accommodated. The housing 131 includes: inlets 131a for inhaling air; and an outlet 131b for exhaling the inhaled air. The inlets 131a are opened along the rotation axis Ax at positions corresponding to the blades 132b of the impeller 132. The outlet 131b is opened in a direction intersecting with the rotation axis Ax of the impeller 132.

When the impeller 132 is rotated, air inhaled from the inlets 131a is pressed against an internal circumferential surface 131c of the housing 131 by the blades 132b. The air pressed is guided along the internal circumferential surface 131c of the housing 131 to the outlet 131b. The air guided to the outlet 131b is exhaled from the outlet 131b to the outside of the first air curtain device 130. That is, the air inhaled along the rotation axis Ax of the impeller 132 is pushed out in the radial direction by the blades 132b rotating, is pressed against the internal circumferential surface 131c of the housing 131, and is exhaled to the outside of the first air curtain device 130 from the outlet 131b, which is opened in the radial direction. The air exhaled to the outside from the outlet 131b is blown toward the cleaning surface 21 of the front LiDAR 6f from the air nozzle 136 (see FIG. 4), which is attached to the outlet 131b. When the impeller 132 having the blades 132b is rotated, air (wind) is continuously blown toward the cleaning surface 21. The air blown toward the cleaning surface 21 flows along the cleaning surface 21.

Dust approaching the cleaning surface 21 is carried away from the cleaning surface 21 by the airflow flowing along the cleaning surface 21 and does not adhere to the cleaning surface 21. In this way, the first air curtain device 130 can prevent a foreign object, such as dust, from adhering to the cleaning surface 21.

In addition to the example described above, a propeller fan, a multiblade fan, a turbo fan, a mixed flow fan, or the like may be adopted as the air blowing mechanism of the first air curtain device 130. These non-positive displacement blowing devices can easily obtain a relatively large air flow rate. A positive displacement blowing device, such as a reciprocating compressor, a rotary screw compressor, a roots-type compressor, and a vane compressor, may be adopted as the air blowing mechanism of the first air curtain device 130. The air blowing mechanism may be referred to as a blower, a pump, or the like as well as a fan.

Next, an operation example of the cleaner system 100 will be described with reference to FIGS. 8 and 9.

Figure 8:
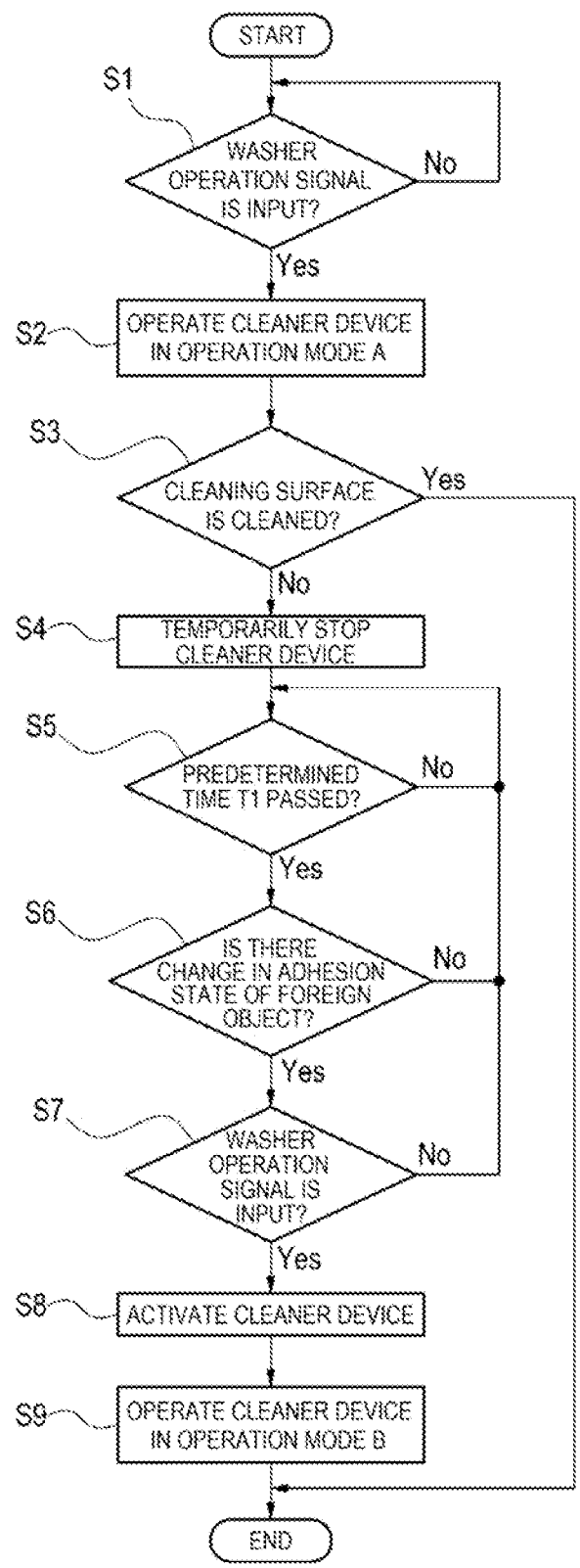
FIG. 8 is a flowchart showing operation of the vehicular cleaner system.

FIG. 8 is a flowchart showing operation of the cleaner system 100. FIG. 9 is a timing chart showing a relationship between a washer operation signal and an operation state of a cleaner device in the cleaner system 100.

The washer operation signal is for operating a cleaner device. The washer operation signal is output, for example, when an ignition switch of the vehicle 1 is turned on or when a washer switch for operating a cleaner device is operated by the driver. The washer operation signal is output, for example, when dirt is detected by a dirt sensor configured to detect dirt on the cleaning surface 21 of the front. LiDAR 6f or when dirt on the cleaning surface 21 is detected based on vehicle surrounding information acquired by the front LiDAR 6f. The washer operation signal is output, for example, when the self-driving mode is started, when bad weather is detected, or it is detected that it is raining or snowing by a weather sensor, when a temperature decrease is detected by a thermometer. The washer operation signal is output, for example, when a speed increase is detected by a vehicle speed sensor, when it is detected that the vehicle 1 enters expressway according to traffic information from a Japan Road Traffic Information Center (JARTIC).

First, an operation example 1 of the cleaner device will be described.

In step S1, the integrative control unit 111 determines whether a washer operation signal is input. When it is determined that the washer operation signal is not input (No in step S1), the integrative control unit 111 repeats step S1. On the other hand, when it is determined that the washer operation signal is input (Yes in step S1), the integrative control unit 111 proceeds to step S2. The present example assumes that a driving-mode selecting switch for switching driving modes of the vehicle 1 to self-driving mode is operated and the washer operation signal (for example, a washer operation signal 205 of FIG. 9) is input into the integrative control unit 111.

In step S2, the integrative control unit 111 controls the cleaner control unit based on the washer operation signal 205 to operate the first cleaner device 120 in an operation mode A (an example of a first mode). In the "operation mode A," the first cleaner device 120 is operated for a time ii as shown in an operation state 211 of FIG. 9. Accordingly, the cleaning liquid is elected from the liquid nozzle 121 of the first cleaner device 120 toward the cleaning surface 21 of the front LiDAR 6f for the time t1.

Next, in step S3, the integrative control unit 111 determines whether the cleaning surface 21 of the front LiDAR of is cleaned (is in a clean state) by the operation in the operation mode A in step S2. The integrative control unit 111 determines whether a foreign object, such as a drop of water, ice (snow), mud, and dust, is adhering to the cleaning surface 21 of the front LiDAR 61 based on, for example, a detection result of the dirt sensor. The integrative control unit 111 may determine whether a foreign object is adhering to the cleaning surface 21 based on, for example, information acquired by the front LiDAR 6f.

In step S3, when it is determined that the cleaning surface 21 is cleaned (Yes in step S3), the integrative control unit 111 ends the cleaning by the first cleaner device 120. On the other hand, when it is determined that the cleaning surface 21 is not cleaned (is not in the clean state, No in Step 3), the integrative control unit 111 proceeds to Step S4.

In step S4, the integrated control unit 111 temporarily stops the operation of the first cleaner device 120.

Next, in step S5, the integrative control unit 111 determines whether a predetermined time T1 (for example, about 1 or 2 hours) has passed since the first cleaner device 120 was stopped. When it is determined that the predetermined time T1 has not passed (No in step S5), the integrative control unit 111 repeats step S5 until the predetermined time T1 passed. On the other hand, when it is determined that the predetermined time T1 has passed (Yes in step S5), the integrative control unit 111 proceeds to step S6.

In step S6, the integrative control unit 111 determines whether there is change in an adhesion state of the foreign object adhering to the cleaning surface 21 of the front LiDAR 6f. For example, the integrative control unit 111 compares a detection result of the dirt sensor in step S6 with the detection result of the dirt sensor in step S3 to determine whether the adhesion state of the foreign object changed. The integrative control unit 111 may determine whether there is change in the adhesion state of the foreign object by comparing information acquired by the front LiDAR 6f.

In step S6, when it is determined that there is no change in the adhesion state of the foreign object (No in step S6), the integrative control unit 111 returns to and repeats step S5. On the other hand, when it is determined that there is change in the adhesion state of the foreign object (Yes in step S6), the integrative control unit 111 inputs a washer operation signal for operating the first cleaner device 120.

Next, in step S7, the integrative control unit 111 determines whether a washer operation signal is input. When it is determined that the washer operation signal is not input (No in step S7), the integrative control unit 111 returns to and repeats step S5. On the other hand, when it is determined that the washer operation signal is input (for example, a washer operation signal 206 of FIG. 9, Yes in step S7), the integrative control unit 111 proceeds to step S8.

In step S8, the integrative control unit 111 activates the first cleaner device 120, which has been stopped.

Next, in step S9, the integrative control unit 111 controls the cleaner control unit to operate the first cleaner device 120 in an operation mode B (an, example of a second mode). In the "operation mode B," the first cleaner device 120 is operated for a time t2 as shown in an operation state 212 of FIG. 9. The operation mode. B is different from the operation mode A. The operation time t2 of the first cleaner device 120 in the operation mode B is set to be longer than the operation time t1 of the first cleaner device 120 in the operation mode A. The cleaning liquid is ejected from the liquid nozzle 121 of the first cleaner device 120 toward the cleaning surface 21 of the front LiDAR 6f for the time t2.

In FIG. 8, for example, when the foreign object on the cleaning surface 21 of the front LiDAR 6f has not been removed by the operation in the operation mode A (No in step 3), the integrative control unit 111 may warn the driver that the driving modes cannot be switched to the self-driving mode due to dirt on the cleaning surface 21. In this case, it is possible to prevent unnecessary repetition of cleaning for the foreign object that cannot be removed. In response to the warning, for example, the driver can stop the vehicle and can clean the cleaning surface 21 to take an appropriate measure in subsequent driving. For example, after the first cleaner device 120 is operated in the operation mode B (step S9), the integrated control unit 111 may determine whether the foreign object on the cleaning surface 21 has been removed based on the detection result of the dirt sensor. When the foreign object has been removed, the integrative control unit 111 may inform the driver that the foreign object has been removed. In this case, it is possible to prevent unnecessary cleaning of the cleaning surface 21 that is clean.

Although a case has been described in which the adhesion state of a foreign object is determined when the predetermined time T1 has passed since the first cleaner device 120 is temporarily stopped in steps S4 to S6, the present invention is not limited thereto. For example, the adhering state of a foreign object may be determined when it is determined that bad weather (it is raining or snowing) has changed to good weather (sunny) based on a detection result of a weather sensor after the first cleaner device 120 is temporarily stopped. This determination may be performed, for example, bet re the predetermined time T1 passed. When the weather has changed from rain or snow to fair, a state of a foreign object (in particular, frozen rain or snow) adhering to the cleaning surface 21 is likely to change, and a possibility that the foreign object can be removed by another cleaning is augmented. For example, the adhering state of a foreign object may be determined when it is determined that a temperature outside the vehicle has increased based on a detection result of a temperature sensor after the first cleaner device is temporarily stopped. This determination may be performed before the predetermined time T1 passed. When the temperature has increased, the state of the reign object adhering to the cleaning surface 21 is likely to change, and the possibility that the foreign object can be removed by another cleaning.

As described above, the cleaner system 100 according to the present embodiment includes: the first cleaner device 120 configured to eject cleaning medium toward the cleaning surface 21 of the front LiDAR 6f; and the integrative control unit 111 configured to operate the first cleaner device 120. When the integrative control unit 111 determines that a foreign object has not been removed after the first cleaner device 120 is operated in the operation mode A in response to the washer operation signal 205, the integrative control unit 111 temporarily stops the first cleaner device 120. When the first cleaner device 170 is operated again after the predetermined time T1 passed, the integrated control unit 111 operates the first cleaner device 120 in the operation mode B, which is different from the operation mode A. According to this configuration, if a foreign object adhering to the cleaning surface 21 cannot be removed by cleaning in the operation mode A, effective cleaning (removal of foreign object) can be performed by changing cleaning modes to the operation mode B. If the foreign object cannot be removed in the operation mode A, it is possible, by stopping the first cleaner device 120 during the predetermined time T1, to prevent an unnecessary cleaning of the first cleaner device 120 for a foreign object that is difficult to wash off.

The cleaner system 100 is configured to detect an adhesion state of a foreign object that could not be removed. When the adhesion state of the foreign object has changed, the cleaner system 100 activates the first cleaner device 120, which has been stopped, to perform the cleaning again. Since the foreign object may be easily removed due to change in the adhesion state of the foreign object, it is possible, by cleaning when the adhesion state has changed, to prevent unnecessary cleaning and to perform effective cleaning. Further, in the cleaning operation after the first cleaner device 120 is activated, operation duration of the first cleaner device 120, that is, ejection duration of the cleaning liquid can be set longer than initial ejection duration of the first cleaner device 120 in the operation mode 13, which is different from the first operation mode A. Therefore, the foreign object that could not be removed in the operation mode A can be effectively washed off in the operation mode B.

Next, an operation example 2 of the cleaner device will be described.

In the operation example 1 described above, when the cleaner device is operated again after the cleaner device was operated once, the ejection duration of the cleaning liquid ejected from the liquid nozzle 121 is increased. In the operation example 2, the cleaner device is operated such that ejection pressure of the cleaning liquid ejected front the liquid nozzle 121 is increased.

Figure 9:
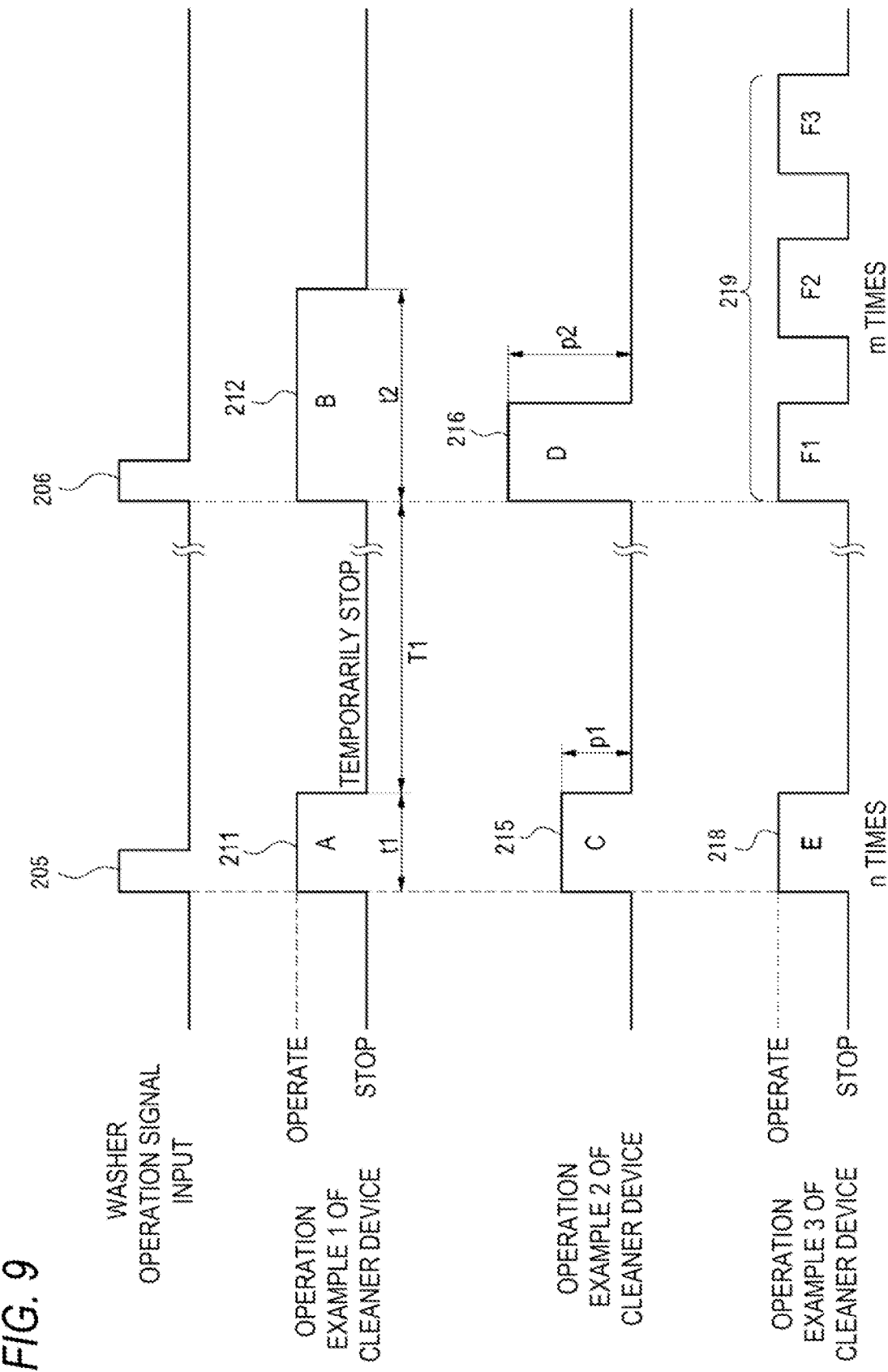
FIG. 9 is a timing chart showing a relationship between a washer operation signal and an operation state of the cleaner device in the vehicular cleaner system.

As shown in FIG. 9, the integrative control unit 111 controls the cleaner control unit based on the washer operation signal 205 to operate the first cleaner device 120 in an operation mode C (an example of the first mode). In the "operation mode C," ejection pressure of the cleaning liquid ejected from the liquid nozzle 121 is p1 as shown in an operation state 215. Accordingly, the cleaning liquid is ejected from the liquid nozzle 121 of the first cleaner device 120 toward the cleaning surface 21 of the front LiDAR 6f at the ejection pressure p1.

The integrative control unit 111 controls the cleaner control unit based on the washer operation signal 206 to operate the first cleaner device 120 in an operation mode D (an example of the second mode). In the "operation mode D," ejection pressure of the cleaning liquid ejected from the liquid nozzle 121 is p2 as shown in an operation state 216. The operation mode D is different from the operation mode C. The ejection pressure p2 of the cleaning liquid in the operation mode D is set to be higher than the ejection pressure p1 of the cleaning liquid in the operation mode C. Accordingly, the cleaning liquid is ejected from the liquid nozzle 121 of the first cleaner device 120 toward the cleaning surface 21 of the front LiDAR 61 at the ejection pressure p2.

Processing of operating the first cleaner device 120 in the operation mode D after operating the first cleaner device 120 in the operation mode C is similar to the processing in the operation example 1 of the cleaner device described with reference to FIG. 8. Although ejection pressure of the cleaning liquid is changed in the operation modes C and D described above, the operation may be performed by changing, for example, an ejection flow rate of the cleaning liquid in the operation modes C and D.

Next, an operation example 3 of the cleaner device will be described.

In the operation example 3 of the cleaner device, when the cleaner device is operated again after the cleaner device was operated once, the number of ejection times of the cleaning liquid ejected from the liquid nozzle 121 is increased.

As shown in FIG. 9, the integrative control unit 111 controls the cleaner control unit based on the washer operation signal 205 to operate the first cleaner device 120 in an operation mode E (an example of the first mode). In the "operation mode E," the cleaning liquid is ejected n times from the liquid nozzle 121 as shown in an operation state 218. Accordingly, the cleaning liquid is ejected n times from the liquid nozzle 121 of the first cleaner device 120 toward the cleaning surface 21 of the front LiDAR 6f.

The integrative control unit 111 controls the cleaner control unit based on the washer operation signal 206 to operates the first cleaner device 120 in an operation mode (F1, F2, and F3, an example of the second mode). In the "operation mode F," the cleaning liquid is ejected in times from the liquid nozzle 121 as shown in an operation state 219. The operation mode F is different from the operation mode E. The number of ejection times m of the cleaning liquid in the operation mode F is set to be larger than the number of ejection times n of the cleaning liquid in the operation mode E. Accordingly, the cleaning liquid is ejected in times from the liquid nozzle 121 of the first cleaner device 120 toward the cleaning surface 21 of the front LiDAR 6f. The in-time ejection of the cleaning liquid are preferably continuous ejection (for example, at an interval shorter than 5 seconds).

In the case of the operation examples 2 and 3 of the cleaner device described above, a foreign object adhering to the cleaning surface 21 that could not be removed in the first mode (the operation mode C or E) can be effectively washed off in the second mode (the operation model D or F) similarly to the operation example 1 of the cleaner device.

Modification

Figure 10:
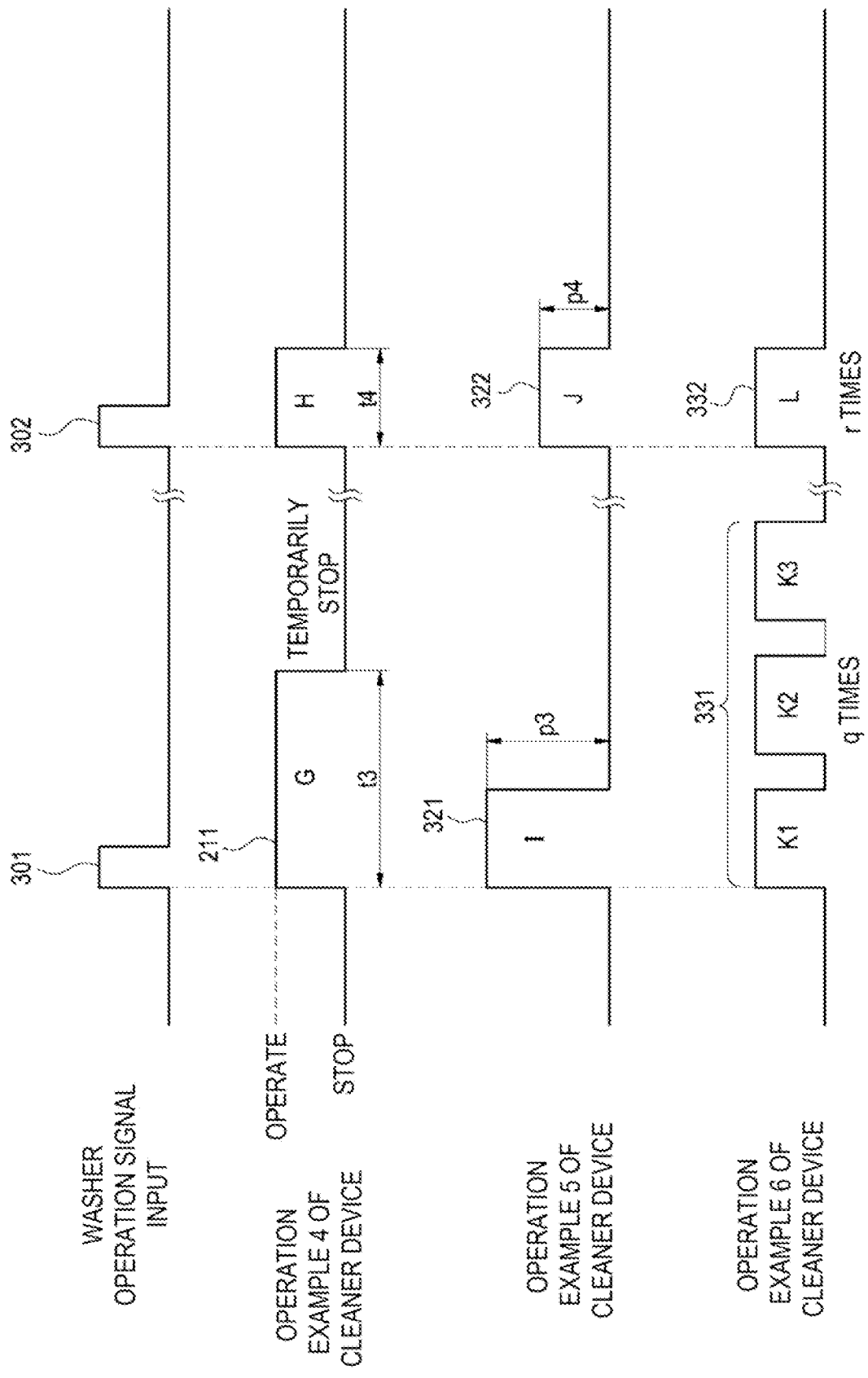
FIG. 10 is a timing chart showing a relationship between a washer operation signal and an operation state ail cleaner device according to a modification.

FIG. 10 is a timing chart showing a relationship between a washer operation signal and an operation state of the cleaner device according; to a modification.

In the operation examples 1 to 3 of the cleaner device described above, when the cleaner device is operated again after the cleaner device was operated once, the later operation mode is stronger than the first operation mode. In an operation example of the cleaner device according to the modification, the later operation mode is weaker than the first operation mode. Other than the cleaning mode is weak, the modification is similar to the operation example 1 of the cleaner device described with reference to FIG. 8.

First, an operation example 4 of the cleaner device will be described.

In the operation example 4 of the cleaner device, when the cleaner device is operated again after the cleaner device was operated once, ejection duration of the cleaning liquid ejected from the liquid nozzle 121 is decreased to be shorter than the ejection duration in the first operation.

As shown in FIG. 10, the integrative control unit 111 controls the cleaner control unit based on a washer operation signal 301 to operate the first cleaner device 120 in an operation mode G (an example of the first mode). In the "operation mode G," the first cleaner device 120 is operated for a time t3 as shown in an operation state 311. Accordingly, the cleaning liquid is ejected from the liquid nozzle 121 of the first cleaner device 120 toward the cleaning surface 21 of the front LiDAR a for the time t3.

The integrative control unit 111 controls the cleaner control unit based on a washer operation signal 302 to operate the first cleaner device 120 in an operation mode H (an example of the second mode). In the "operation mode H," the first cleaner device 120 is operated for a time 14 as shown in an operation state 312. The operation mode H is different from the operation mode G. The operation time t4 of the first cleaner device 120 in the operation mode H is set to be shorter than the operation time t3 of the first cleaner device 120 in the operation mode G. Accordingly, the cleaning liquid is ejected from the liquid nozzle 121 of the first cleaner device 120 toward the cleaning surface 21 of the front LiDAR 6f for the time t4.

Next, an operation example 5 of the cleaner device will be described.

In the operation example 5 of the cleaner device, when the cleaner device is operated again after the cleaner device was operated once, ejection pressure of the cleaning liquid ejected from the liquid nozzle 121 is decreased.

As shown in FIG. 10, the integrative control unit 111 controls the cleaner control unit based on the washer operation signal 301 to operate the first cleaner device 120 in an operation mode 1 (an example of the first mode). In the "operation mode 1," ejection pressure of the cleaning liquid ejected from the liquid nozzle 121 is p3 as shown in an operation state 321. Accordingly, the cleaning liquid is ejected from the liquid nozzle 121 of the first cleaner device 120 toward the cleaning surface 21 of the front LiDAR 6f at the ejection pressure p3.

The integrative control unit 111 controls the cleaner control unit based on the washer operation signal 302 to operate the first cleaner device 120 in an operation mode (an example of the second mode). In the "operation mode J," ejection pressure of the cleaning liquid ejected from the liquid nozzle 121 is p4 as shown in an operation state 322. The operation mode J is different from the operation mode I. The ejection pressure p4 of the cleaning liquid in the operation mode J is set to be lower than the ejection pressure p3 of the cleaning liquid in the operation mode 1. Accordingly, the cleaning liquid is ejected from the nozzle 121 of the first cleaner device 120 toward the cleaning surface 21 of the front LIDAR if at the ejection pressure p4.

Although the ejection pressure of the cleaning liquid is changed in the operation modes land the cleaner device may be operated by changing, for example, an ejection flow rate of the cleaning liquid in the operation modes I and J.

Next, an operation example 6 of the cleaner device will be described.

In the operation example 6 of the cleaner device, when the cleaner device is operated again after the cleaner device was operated once, the number of ejection times of the cleaning liquid ejected from the liquid nozzle 121 is decreased.

As shown in FIG. 10, the integrative control unit 111 controls the cleaner control unit based on the washer operation signal 301 to operate the first cleaner device 120 in an operation mode K (K1, K2, and K3, an example of the first mode). In the "operation mode K," the cleaning liquid is ejected q times from the liquid nozzle 121 as shown in an operation state 331. Accordingly, the cleaning liquid is ejected q times from the liquid nozzle 121 of the first cleaner device 120 toward the cleaning surface 21 of the front LiDAR 6f. The q-time ejection of the cleaning liquid are preferably continuous ejection for example, at an interval shorter than 5 seconds).

The integrative control unit 111 controls the cleaner control unit based on the washer operation signal 302 to operate the first cleaner device 120 in an operation mode L (an example of the second mode). In the "operation mode L," the cleaning liquid is ejected r times from the liquid nozzle 121 as shown in an operation state 332. The operation mode L is different from the operation mode K. The number of ejection times r of the cleaning liquid in the operation mode L is set to be smaller than the number of ejection times q of the cleaning liquid in the operation mode K. Accordingly, the cleaning liquid is ejected r times from the liquid nozzle 121 of the first cleaner device 120 toward the cleaning surface 21 of the front LiDAR 6f.

When cleaning is performed by operating the cleaner device in the first mode, foreign objects may be partially removed. In this case, according to the operation examples 4 to 6 of the cleaner device described above, it is possible, by setting the second mode (operation modes H, J and L) weaker than the first mode (operation modes G, I, and K), to clean minor dirt that could not be removed in the first mode effectively in the second mode and to prevent power consumption of the first cleaner device 120.

Although, in the embodiment described above, the cleaner device is temporarily stopped when it is determined that a foreign object has not removed after the cleaner device was operated in the first mode, and the cleaner device is operated in the second mode in accordance with an adhesion state of the foreign object when the predetermined time T1 passed in the embodiment described above, the present invention is not limited thereto. For example, when the washer operation signal is received again within a predetermined time T2 (for example, about 10 minutes) after the cleaner device was operated in the first mode, the cleaner device may be operated in the second mode. When it is determined that the foreign object has not been removed, the cleaner device may be temporarily stopped and processing similar to the processing after step S5 in FIG. 8 may be performed thereafter.

For example. When the driver repeatedly operates the driving-mode selecting switch many times (for example, more than five times) to switch driving modes to the self-driving mode (when the washer operation signal does not settle down) within the predetermined time T2 (for example about 10 minutes) after the cleaner device was operated in the first mode the cleaner device may be operated in the second mode.

Second Embodiment

As shown in FIG. 1, the vehicle 1 may include a sensor system 100A equipped with a vehicular cleaner (hereinafter, referred to as a sensor system 100A) according to a second embodiment. The vehicle 1 can travel in self-driving mode in the second embodiment.

Figure 11:
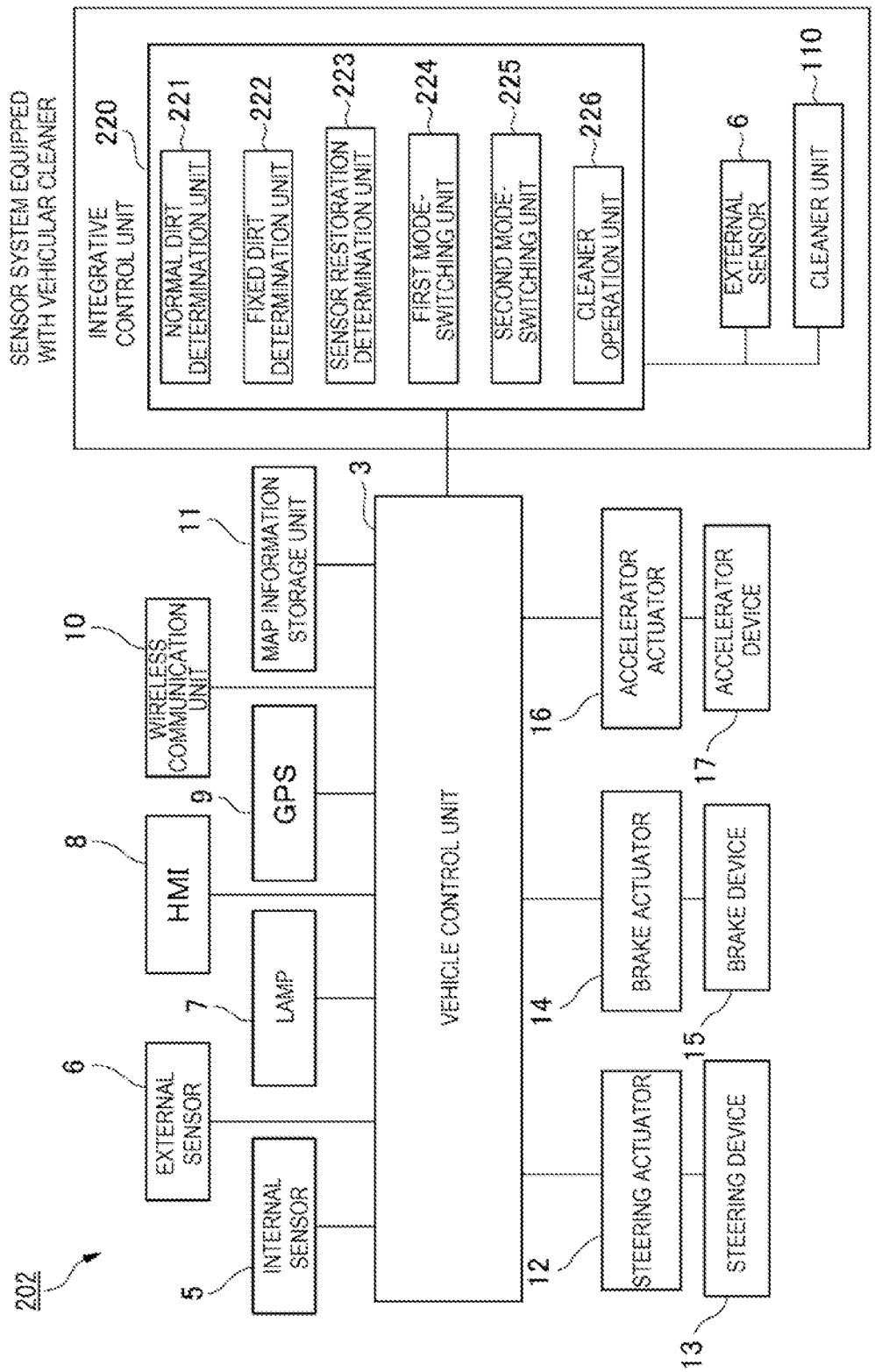
FIG. 11 is a block diagram showing a vehicle system according to the second embodiment.

First, a vehicle system 202 according to the second embodiment of the vehicle 1 will be described with reference to FIG. 11. FIG. 11 is a block diagram showing the vehicle system 202. As shown in FIG. 11, the vehicle system 202 includes: the vehicle control unit 3; the internal sensor 5; the external sensor 6; the lamp 7; the human machine interface (HMO 8; the global positioning system (GPS) 9, the wireless communication unit 10; and the map information storage unit 11. The vehicle system 202 further includes: the steering actuator 12; the steering device 13, the brake actuator 14; the brake device 15, the accelerator actuator 16; and the accelerator device 17. Since these components are similar to those in the first embodiment, detailed description thereof will be omitted.

Figure 12:
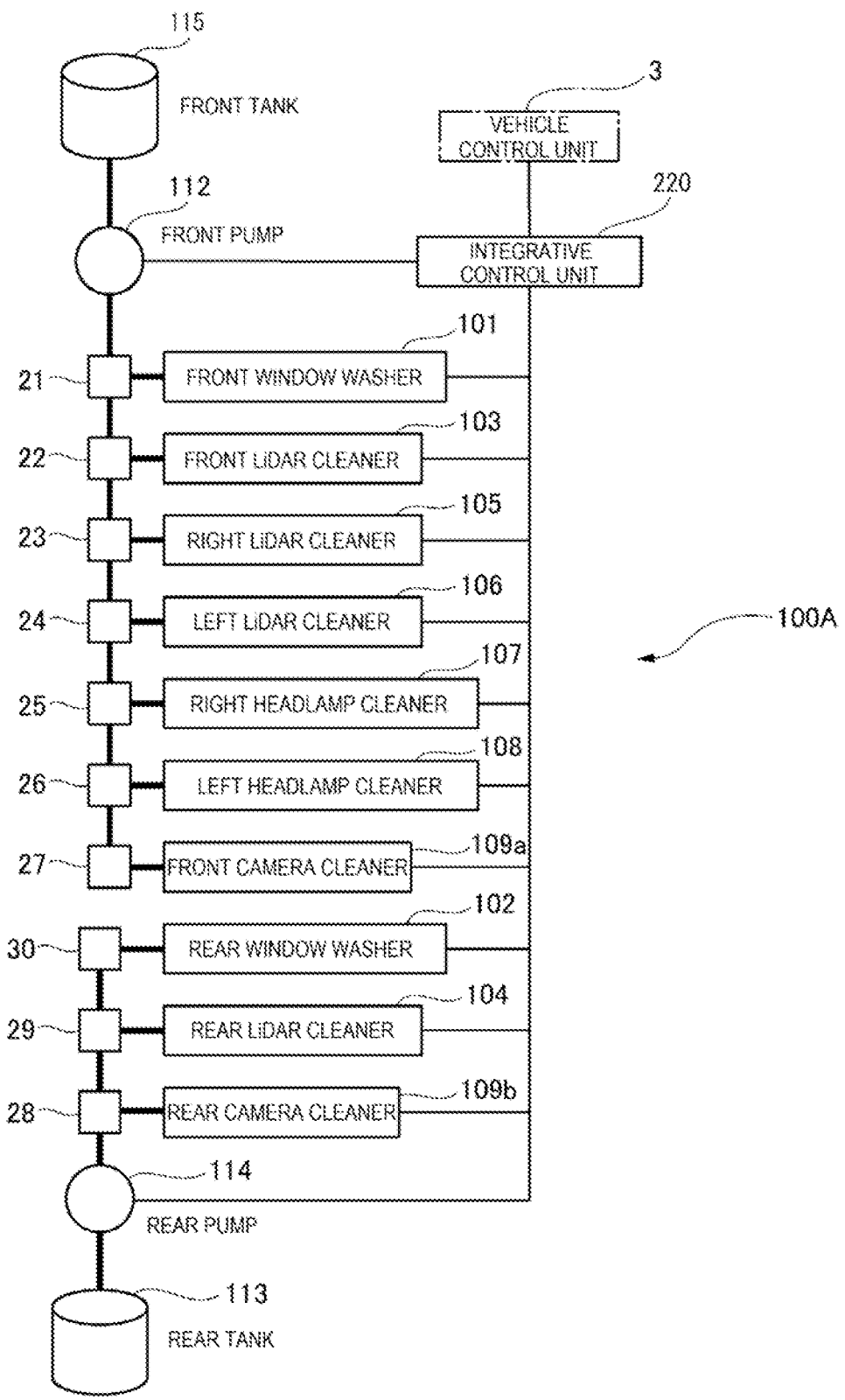
FIG. 12 is a block diagram showing a sensor system.

FIG. 12 is a block diagram showing, the sensor system 100A. The sensor system 100A includes: a front tank 115; a front pump 112; a rear tank 113; a rear pump 114; and an integrative control unit 220 (an example of a sensor control unit), in addition to the front WW 101 to the rear camera cleaner 109b.

The front WW 101, the front LC 103, the right LC 105, the left LC 106, the right HC 107, the left HC 108 and the front camera cleaner 109a are connected to the front tank 115 via the front pump 112. The front pump 112 is configured to send cleaning liquid stored in the front tank 115 to the front WW 101, the front LC 103, the right LC 105, the left LC 106, the right HC 107, the left HC 108, and the front camera cleaner 109a.

The rear WW 102, the rear LC 104, and the rear camera cleaner 109b are connected to the rear tank 113 via the rear pump 114. The rear pump 114 is configured to send cleaning liquid stored in the rear tank 113 to the rear. WW 102, the rear LC 104, and the rear camera cleaner 109b.

Each of the front WW 101 to the rear camera cleaner 109b is provided with an actuator (not shown) configured to open a nozzle to discharge cleaning liquid to a cleaning object. The actuators provided in the front WW 101 to the rear camera cleaner 109b are electrically connected to the integrative control unit 220. The integrative control unit 220 is also electrically connected to the front pump 112, the rear pump 114, and the vehicle control unit 3. In the sensor system 100A, the front WW 101 to the rear camera cleaner 109b and the pumps 112 and 114 are configured to operate based on operation signals output from the integrative control unit 220. In the following description, the front WW 101 to the rear camera cleaner 109b may be referred to as a cleaner unit 110.

Referring back to FIG. 11, the vehicle system 202 is electrically connected to the sensor system 100A. The sensor system 100A includes the integrated control unit 220, the external sensor 6, and the cleaner unit 110. The integrative control unit 220 of the sensor system 100A is communicably connected to the vehicle control unit 3 of the vehicle system 202.

The integrative control unit 220 is communicably connected to the cleaner unit 110 and the external sensor 6. The integrated control unit 220 is configured to control operation of the cleaner twit 110 and the external sensor 6.

The integrative control unit 220 controls the external sensor 6 and the cleaner unit 110 in accordance with a signal output from the vehicle control unit 3. In the present embodiment, the integrative control unit 220 receives a signal for turning on the cleaner system from the vehicle control unit 3, and the integrative control unit 220 controls operation of each of the cleaner unit 110 based on an input from the external sensor 6.

The external sensor 6 may be configured to transmit information to the vehicle control unit 3 via the integrated control unit 220 or may be configured to transmit information directly to the vehicle control unit 3 without passing through the integrative control unit 220. In the second embodiment, the external sensor 6 is configured to transmit information to the vehicle control unit 3 via the integrative control unit 220.

The cleaner unit 110 is configured to operate in a regular mode or a block mode. In the regular mode, the cleaner unit 110 is set to operate in response to an operation signal input from the integrative control unit 220. In the block mode, the cleaner unit 110 is set not to operate even when the operation signal is input from the integrated control unit 220.

The external sensor 6 is configured to operate in a normal mode or a standby mode. In the normal mode, the external sensor 6 is set to operate at a predetermined interval (normal interval). In the standby mode, the external sensor 6 is set to operate at an interval (standby interval) longer than the interval in the normal mode. In the standby mode, the interval is set to, for example, 30 minutes, 1 hour, or 2 hours.

As shown in FIG. 11, the integrative control unit 220 includes: a normal dirt determination unit 221; a fixed dirt determination unit 222; a sensor restoration determination unit 223; a first mode-switching unit 224; a second mode-switching unit 225; and a cleaner operation unit 226.

Next, an operation flow in which the integrative control unit 221) controls the external sensor 6 and the cleaner unit 110 will be described with reference to FIG. 13.

Figure 13:
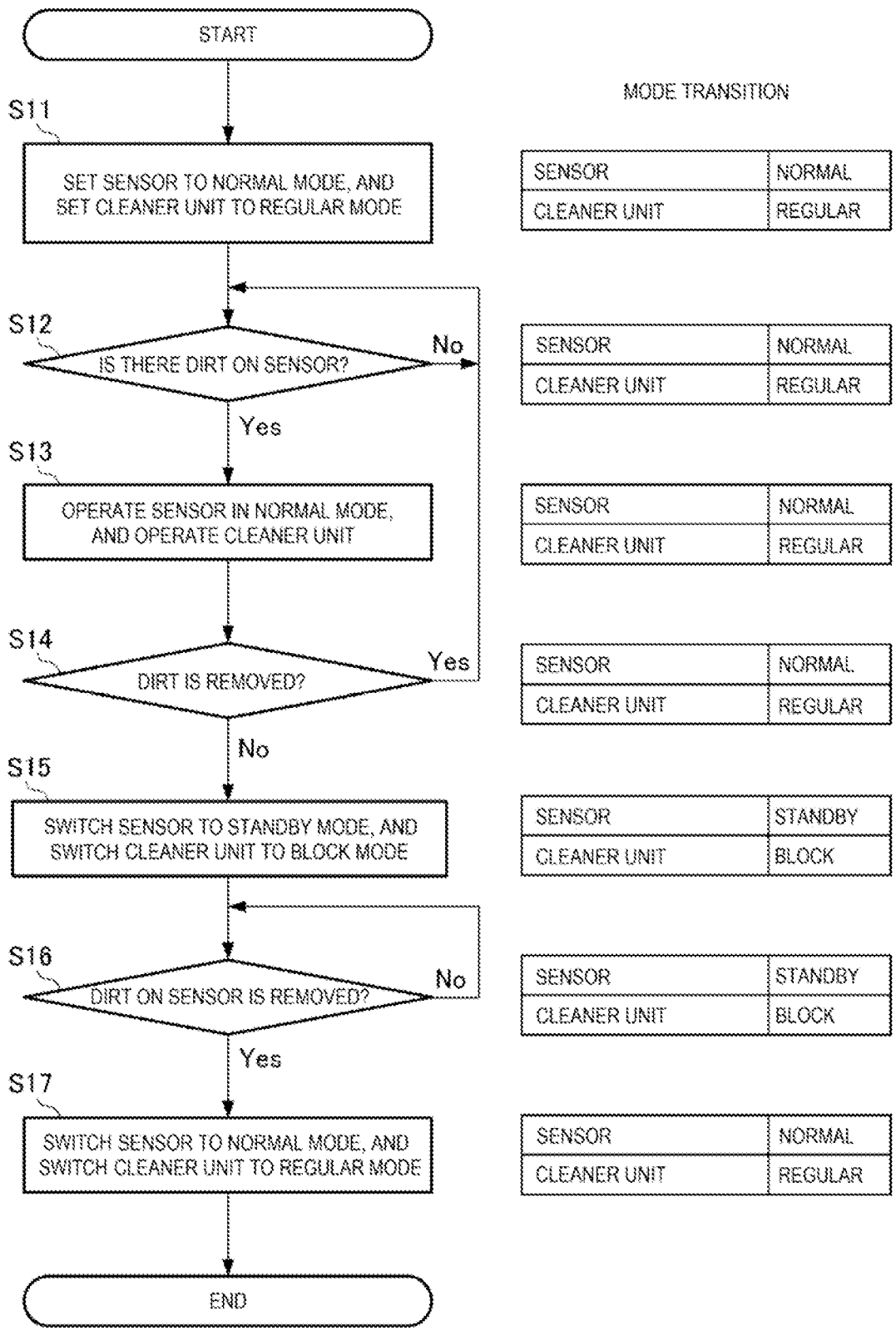
FIG. 13 is a flowchart showing processing executed by the sensor system according to the second embodiment.

FIG. 13 is a flowchart showing processing executed by the sensor system 100A, mode set for the external sensor 6 and the cleaner unit 110 in each step is shown at the right side of the flowchart in FIG. 13.

In the following, the front camera 6c is an example of the external sensor 6, and the front camera cleaner 109a is an example of the cleaner unit 110.

When the ignition of the vehicle 1 is turned on and the sensor system 100A is activated, first, the integrative control unit 220 sets an operation mode of the front camera 6c to the normal mode and sets an operation mode of the front camera cleaner 109a to the regular mode. The front camera 6c set to the normal mode operates at the normal interval to shoot vehicle surroundings. The front camera cleaner 109a set to the regular mode is brought into an input standby state in which the front camera cleaner 109a operates in response to input of the operation signal.

Next, in step S12, the normal dirt determination unit 221 of the integrative control unit 220 analyzes the image output from the front camera 6c at the normal interval to determine whether there is dirt on the front camera 6c.

When it is determined that there is no dirt on the front camera 6c (No in step S12), the integrative control unit 220 does not operate the front camera cleaner 109a. On the other hand, when it is determined that there is dirt on the from camera 6c (Yes in step S12), the integrative control unit 220 proceeds to step S13. The normal dirt determination unit 221 determines that there is dirt on the front camera 6c, for example, when a region to which dirt is adhering exceeds 20% of a detection range in the image took by the limit camera 6c.

In step S13, the cleaner operation unit 226 of the integrative control unit 220 outputs an operation signal to the front camera cleaner 109a to operate the front camera cleaner 109a in order to remove dirt adhering to the front camera 6c. In this case, the operation mode of the front camera 6c remains in the normal mode, and the operation mode of the front camera cleaner 109a remains in the regular mode.

Next, in step S14, the fixed dirt determination unit 222 of the integrative control unit 220 analyzes the image output from the front camera 6c at the normal interval to determine whether the dirt on the front camera 6c has been removed by cleaning by the front camera cleaner 109a For example, when it is determined that the region of the external sensor 6 does not expand based on the output of the external sensor 6 after the cleaning by the cleaner unit 110, the fixed dirt determination unit 222 determines that the dirt on the external sensor 6 cannot be removed. Alternatively, when the cleaner unit 110 has operated for more than a predetermined number of times within a predetermined time, the fixed dirt determination unit 222 may determine that the dirt on the external sensor 6 cannot be removed by the cleaning of the cleaner unit 110.

When it is determined that the dirt on the front camera 6c has been removed (Yes in step S14), the integrative control unit 220 returns to step S12. On the other hand, when it is determined that the din on the front camera 6c cannot be removed (No in step S14), the integrative control unit 220 proceeds to step S15.

In step S15, the first mode-switching unit 224 of the integrative control unit 220 changes the operation modes of the front camera 6c from the normal mode to the standby mode. The integrative control unit 220 changes the operation modes of the front camera cleaner 109a from the regular mode to the block mode. The front camera 6c set to the standby mode operates at a standby interval (for example, 10 minutes to 1 hour) longer than the normal interval of the normal mode and shoots vehicle surroundings. The truant camera cleaner 109a set to the block mode is brought into an operation block state in which the front camera cleaner 109a does not operate even when an operation signal is input.

Next, in step S16, the sensor restoration determination unit 223 of the integrative control unit 220 analyzes the image output from the front camera 6c at the standby interval to determine whether dirt on the front camera 6c has been removed. For example, when a certain period of time (standby interval) has passed since the standby mode is set, it is expected that an adhesion state of the dirt can change in accordance with change in surroundings. For example, dust can be removed by aerodynamic drag, and adhering snow can be melted due to a rise in a temperature. Then, when a proportion of a region determined to be dirty in the image by the front camera 6c is decreased, it is expected that the dirt can be removed in the region by cleaning by the front camera cleaner 109a. Therefore, when a predetermined time has passed since the standby mode was set, the sensor restoration determination unit 223 determines whether the dirt on the front camera 6c has been removed.

For example, when the region of the external sensor 6 is wider than that immediately before entering the standby mode, the sensor restoration determination unit 223 determines that the dirt on the external sensor 6 has been removed. Alternatively, when sensitivity of the external sensor 6 exceeds reference sensitivity of the external sensor 6 the sensor restoration determination unit 223 determines that the dirt on the external sensor 6 has been removed.

When it is determined that the dirt on the front camera 6c has not been removed (No in step S16), the integrative control unit 220 is on standby until the integrative control unit 220 determines again whether there is dirt once when the standby interval has passed. If the dirt on the front camera 6c has not been removed, it is expected that the dirt will not be removed by operation of the front camera cleaner 109a since a situation of the host vehicle has not been changed probably.

On the other hand, when it is determined that the dirt on the front camera 6c has been removed (Yes in step S16), the integrative control unit 220 proceeds to step S17. For example, when the sensor restoration determination unit 223 analyzes that the proportion of the region determined to be dirty in the image by the front camera 6c is by more than 10%, the sensor restoration determination unit 223 determines that the dirt on the front camera 6c has been removed.

In step S17, the second mode-switching unit 225 of the integrative control unit 220 changes the operation modes of the front camera 6c from the standby mode to the normal mode. The second mode-switching unit 225 changes the operation modes of the front camera cleaner 109a from the block mode to the regular mode. The front camera 6c set to the normal mode operates at the normal interval to shoot vehicle surroundings. The front camera cleaner 109a set to the regular mode is brought into an input standby state in which the front camera cleaner 109a operates in response to input of the operation signal.

The sensor system 100A according to the second embodiment includes: the external sensor 6; the cleaner unit 110 configured to clean the external sensor 6; and the integrative control unit 220 configured to control the external sensor 6 and the cleaner unit 110. The external sensor 6 is configured to operate in a normal mode in which the external sensor 6 operates at a predetermined interval and a standby mode in which the external sensor 6 operates at an interval longer than the interval in the normal mode. The cleaner unit 110 is configured to operate in a regular mode in which cleaning operation is performed in response to an operation signal output in accordance with a dirt determination result of the external sensor 6 and to operate in a block mode in which cleaning operation is not performed in response to the output operation signal. The integrative control unit 220 includes: the normal dirt determination unit 221 configured to determine whether dirt is adhering to the external sensor 6 based on the output of the external sensor 6 when the cleaner unit 110 is in the normal mode; the fixed dirt determination unit 222 configured to determine whether dirt on the external sensor 6 can be removed by cleaning of the cleaner unit 110; the first mode-switching unit 224 configured to change the external sensor 6 from the normal mode to the standby mode when the fixed dirt determination unit 222 determines that dirt on the external sensor 6 cannot be removed; the sensor restoration determination unit 223 configured to determine whether dirt on the external sensor 6 has been removed based on the output of the external sensor 6 when the external sensor 6 is in the standby mode; and the second mode-switching unit 225 configured to switch the external sensor 6 back from the standby mode to the normal mode when the sensor restoration determination unit 223 determines that dirt on the external sensor 6 has been removed.

When dirt on the external sensor 6 has not been removed even after the external sensor 6 was cleaned by the cleaner unit 110, information detected by the external sensor 6 is less accurate. When there is dirt on the external sensor 6, detection by the external sensor 6 at the normal interval is apt to be in vain. Therefore, when dirt on the external sensor 6 cannot be removed, the integrative control unit 220 sets the external sensor 6 to the standby mode to increase the interval at which the external sensor 6 operates, thereby reducing power consumed in the external sensor 6. When the external sensor 6 is in the standby mode, the dirt on the external sensor 6 cannot be removed by cleaning of the external sensor 6, and thus operation of the cleaner unit 110 is useless. Therefore, when the external sensor 6 is in the standby mode, the integrative control unit 220 sets the cleaner unit 110 to the block mode in order not to operate the cleaner unit 110. As a result, power consumption of the cleaner unit 110 can be reduced, and the cleaning medium can be saved. However, it is not preferable for the external sensor 6 to remain in the standby mode, or in a non-operation state in this manner. It is not realistic for an occupant of the vehicle to determine that the dirt on the external sensor 6 has been removed and set the external sensor 6 to the normal mode. Therefore, the integrative control unit 220 switches the external sensor 6 back to the normal mode when it is determined that the dirt on the external sensor 6 has been removed (the adhesion state of the dirt has changed) in detection by the external sensor 6 in the standby mode. The integrative control unit 220 switches the cleaner unit 110 back to the regular mode in accordance with the switching of the external sensor 6 to the normal mode, and the cleaner unit 110 operates in response to input of the operation signal.

Although the normal dirt determination unit 221, the fixed dirt determination unit 222, the sensor restoration determination unit 223, the first mode-switching unit 224, the second mode-switching unit 225, and the cleaner operation unit 226 are included in the integrative control unit 220 (an example of a sensor control unit) in the second embodiment, the present invention is not limited thereto. For example, some of these components 221 to 226 may be included in the vehicle control unit 3 configured to control traveling of the vehicle 1 or may be included in a cleaner control unit configured to control the cleaner unit 110.

Third Embodiment

Figure 14:
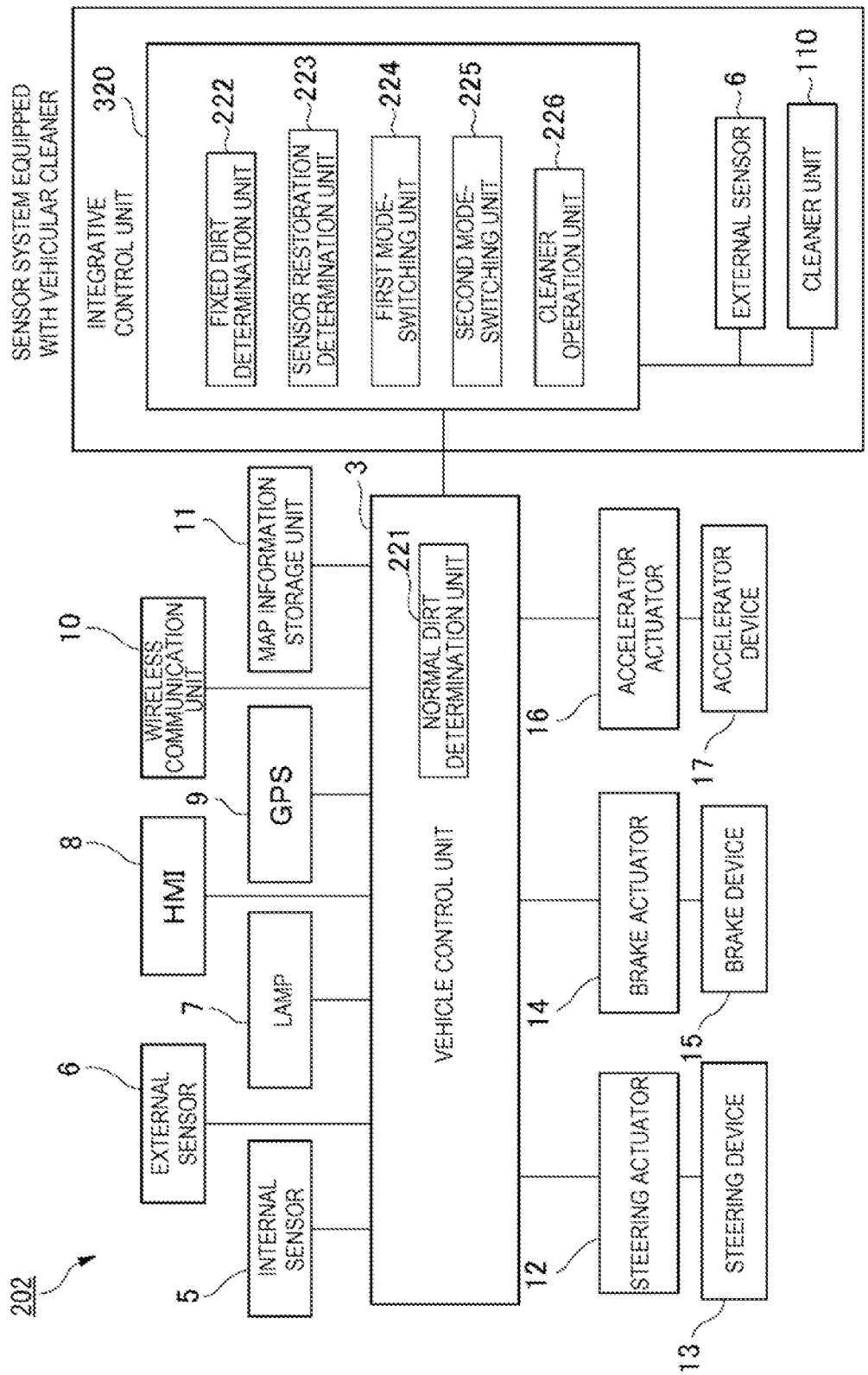
FIG. 14 is a block diagram showing a sensor system according to a third embodiment.

FIG. 14 is a block diagram showing a sensor system 100B according to a third embodiment.

As shown in FIG. 14, the normal dirt determination unit 221 may be included in the vehicle control unit 3. In the present embodiment, the vehicle control unit 3 determines operation of the cleaner unit 110 based on the output of the external sensor 6. An integrative control unit 320 operates a specific cleaner unit 110 based on a signal front the vehicle control unit 3 for operating the specific cleaner unit 110. That is, the vehicle control unit 3 may be configured to determine the dirt on the external sensor 6 when the external sensor 6 is set to the normal mode. In this case, the in control unit 320 of the sensor system 100B includes; the fixed dirt determination unit 222; the sensor restoration determination unit 223; the first mode-switching unit 224; the second mode-switching unit 225; and the cleaner operation unit 226.

Since the flowchart showing processing executed by the sensor system 100B according to the third embodiment is similar to FIG. 13, detailed description thereof will be omitted. In the sensor system 100B according to the third embodiment, the vehicle control unit 3 is configured to interpret sensor information output from the external sensor 6 in order to control the vehicle 1. Therefore, a configuration in which the vehicle control unit 3 performs the dirt determination in a normal state is easily achievable. In this configuration, the vehicle control unit 3 is configured to receive sensor information flout the external sensor 6 via the integrative control unit 320 and to transmit an operation signal to the cleaner unit 110 to remove the dirt on the external sensor 6 in a normal state based on the received sensor information.

However, when dirt that cannot be removed even by cleaning by the cleaner unit 110 is adhering to the external sensor 6, the external sensor 6 and the cleaner unit 110 are controlled by the integrative control unit 320 of the sensor system 100B and the dirt on the external sensor 6 is removed similarly to the second embodiment.

The sensor system 100B according to the third embodiment can reduce power consumption similarly to the sensor system 100A according to the second embodiment.

Fourth Embodiment

Figure 15:
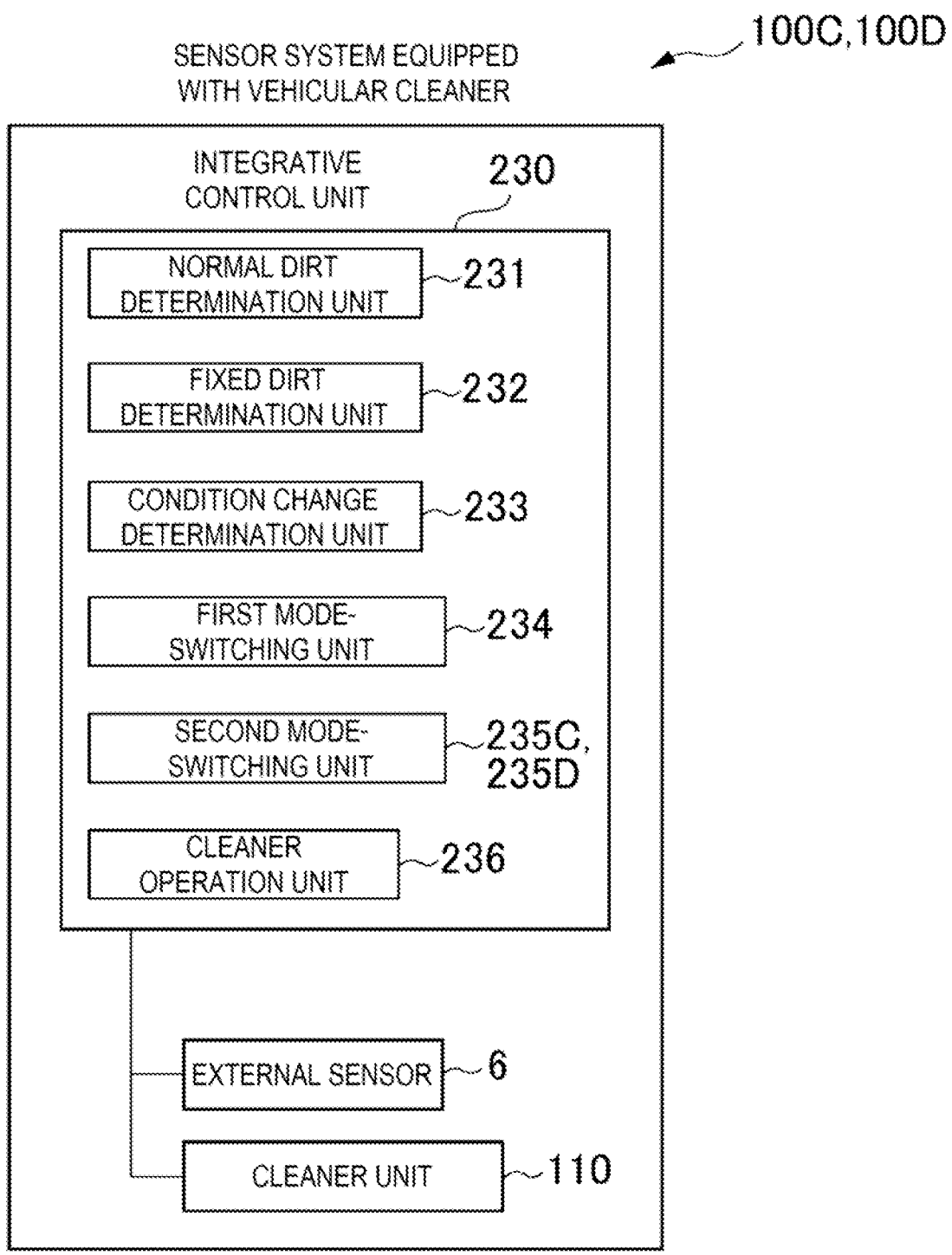
FIG. 15 is a block diagram showing sensor systems according to a fourth embodiment and a fifth embodiment.
Figure 16:
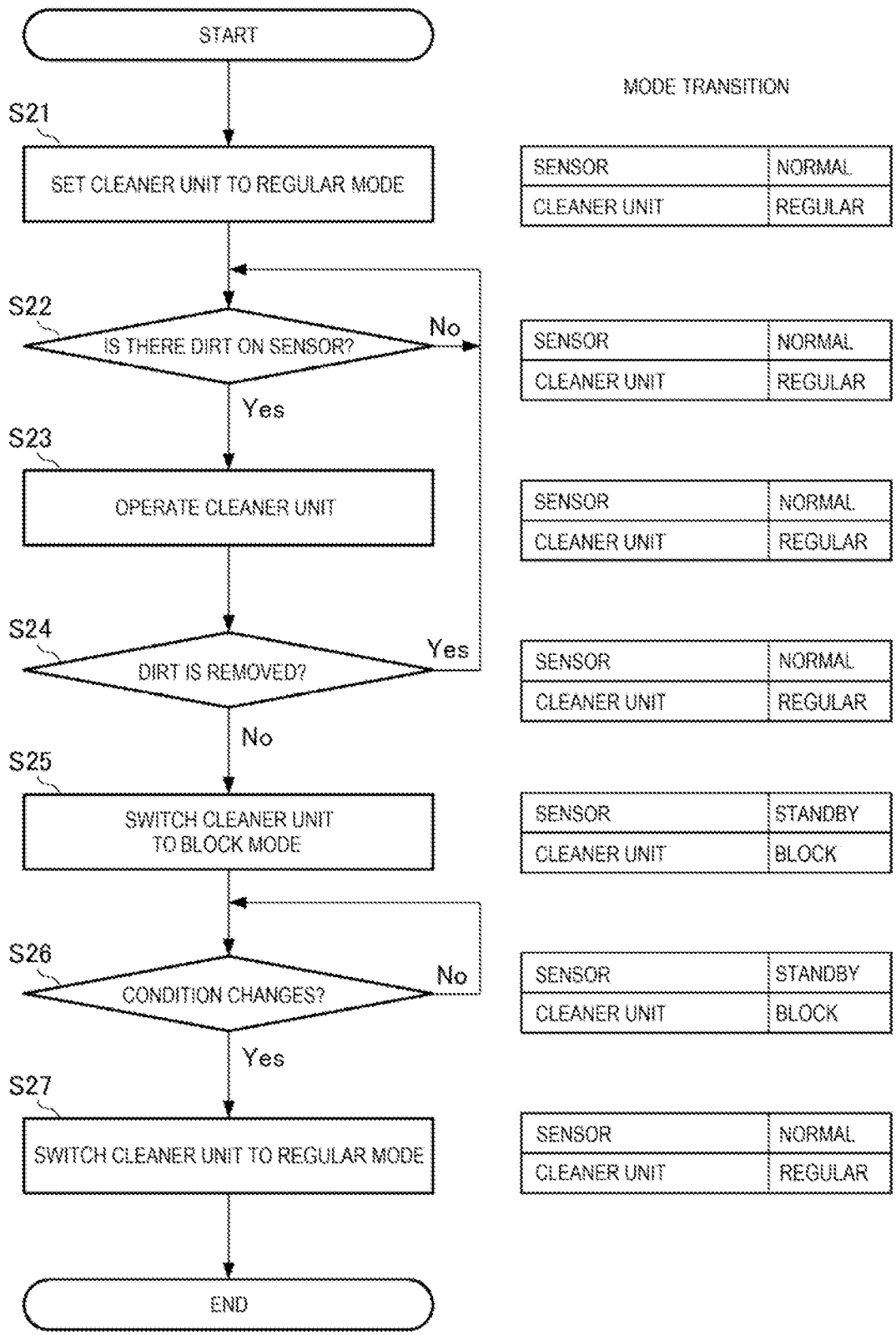
FIG. 16 is a flowchart showing processing executed by the sensor system according to the fourth embodiment.

FIG. 15 is a block diagram showing a sensor system 100C according to a fourth embodiment. FIG. 16 is a flowchart showing processing executed by the sensor system 100C according to the fourth embodiment. A mode set for the front camera 6c and the front camera cleaner 109a in each step is shown at the right side of the flowchart in FIG. 16.

In the sensor system 100C according to the fourth embodiment, an integrative control unit 230 (an example of the cleaner control unit) is configured to function as a cleaner control unit configured to control the cleaner unit 110. As shown in FIG. 15, the integrative control unit 230 includes: a normal dirt determination unit 231; a fixed dirt determination unit 232; a condition change determination unit 233; a first mode-switching unit 234; a second mode-switching unit 235C; and a cleaner operation unit 236.

The normal dirt determination unit 231, the fixed dirt determination unit 232, and the cleaner operation unit 236 are similar to the normal dirt determination unit 221, the fixed dirt determination unit 222, and the cleaner operation unit 226 in the integrative control unit 220 according to the second embodiment, respectively.

As shown in FIG. 16, when the ignition of the vehicle 1 is turned on and the sensor system 1000 is activated, first the integrative control unit 230 sets an operation mode of the front camera cleaner 109a to the normal mode in step S21. The front camera cleaner 109a set to the normal mode is brought into an input standby state in which the front camera cleaner 109a operates in response to input of an operation signal.

Next, in step S22, the normal dirt determination unit 231 of the integrative control unit 230 analyzes the image output from the front camera 6c to determine whether there is dirt on the front camera 6c.

When it is determined that there is no dirt on the front camera 6c (No in step S22), the integrative control unit 230 does not operate the front camera cleaner 109a and continues to acquire the image from the front camera 6c. On the other hand, when it is determined that there is dirt on the front camera 6c (Yes in step S22), the integrative control unit 230 proceeds to step S23.

In step S23, the cleaner operation unit 236 of the integrative control unit 230 outputs an operation signal to the front camera cleaner 109a in order to operate the front camera cleaner 109a and to remove dirt adhering to the front camera 6c.

Next, in step S24, the fixed dirt determination unit 232 of the integrative control unit 230 analyzes the image output from the front camera 6c to determine whether the dirt on the front camera 6c has been removed by cleaning by the front camera cleaner 109a.

When it is determined that the dirt on the front camera 6c has been removed (Yes in step S24), the integrative control unit 230 returns to step S22. On the other hand, when it is determined that the dirt on the front camera 6c cannot be removed (No in step S24), the fixed dirt determination unit 232 of the integrative control unit 230 proceeds to step S25.

In step S25, the first mode-switching unit 224 of the integrative control unit 230 switches operation modes of the front camera cleaner 109a from the regular mode to the block mode. The front camera cleaner 109a set to the block mode is brought into an operation block state in which the front camera cleaner 109a does not operate even when an operation signal is input.

Next, in step S26, the condition change determination unit 233 of the integrative Control unit 230 determines whether change satisfying a predetermined condition has occurred in surroundings of the host vehicle after the front camera cleaner 109a is switched to the bock mode. The predetermined condition is, for example, that a predetermined time has passed, that weather has changed, that a temperature has changed by more than a predetermined value, that a vehicle speed has charmed by more than a predetermined value, mileage has increased by a predetermined value, or the like.

When it is determined that charge satisfying the predetermined condition has occurred (Yes in step S26), the integrative control unit 230 proceeds to Step S27. On the other hand, when it is determined that such change has not occurred (No in step S26), the integrative control unit 230 repeats the determination until it is determined that such change has occurred. If such change has not occurred, it is expected that the dirt will not be removed by operation of the front camera cleaner 109a since a situation of the host vehicle has not been changed probably.

In step S27, the second mode-switching unit 235C of the integrative control unit 230 switches the operation modes of the front camera cleaner 109*a* from the block mode to the regular mode. The from camera cleaner 109*a* set to the regular mode is brought into an input standby state in which the front camera cleaner 109*a* operates in response to input of an operation signal.

For example, when a predetermined time (for example, 30 minutes, 1 hour, or the like) has passed since the cleaner unit 110 was switched to the block mode, adhesion state of dirt may change and the dirt can be removed. When weather changes from sunny to rain, adhering mud may be easily removed. When weather changes from snow to rain, adhering snow may be easily removed. When a temperature rises, adhering snow may melt, when a vehicle speed changes, snow or dust may be blown off by aerodynamic drag. When the vehicle travels for more than a predetermined distance, an adhesion state of dirt may change. In this manner, when a condition of the vehicle 1 or surroundings of the vehicle 1 changes, it is expected that an adhesion state of dirt changes and the dirt can be removed. Therefore, when the condition change determination unit 233 determines that such change has occurred, operation modes of the front camera cleaner 109*a* is switched from the block mode to the regular mode.

In the sensor system 100C according to the fourth embodiment, the cleaner unit 110 is switched to the block mode when it is determined that dirt on the external sensor 6 cannot be removed by cleaning by the cleaner unit. 110 and then is switched to the regular mode when it is determined that a predetermined condition under which an adhesion state of dirt on the external sensor 6 may change is satisfied. According to this configuration, since the block mode is maintained until the predetermined condition under which dirt can be easily removed is satisfied, vain operation of the cleaner unit 110 can be prevented, thereby reducing power consumption of the system.

Fifth Embodiment

Figure 17:
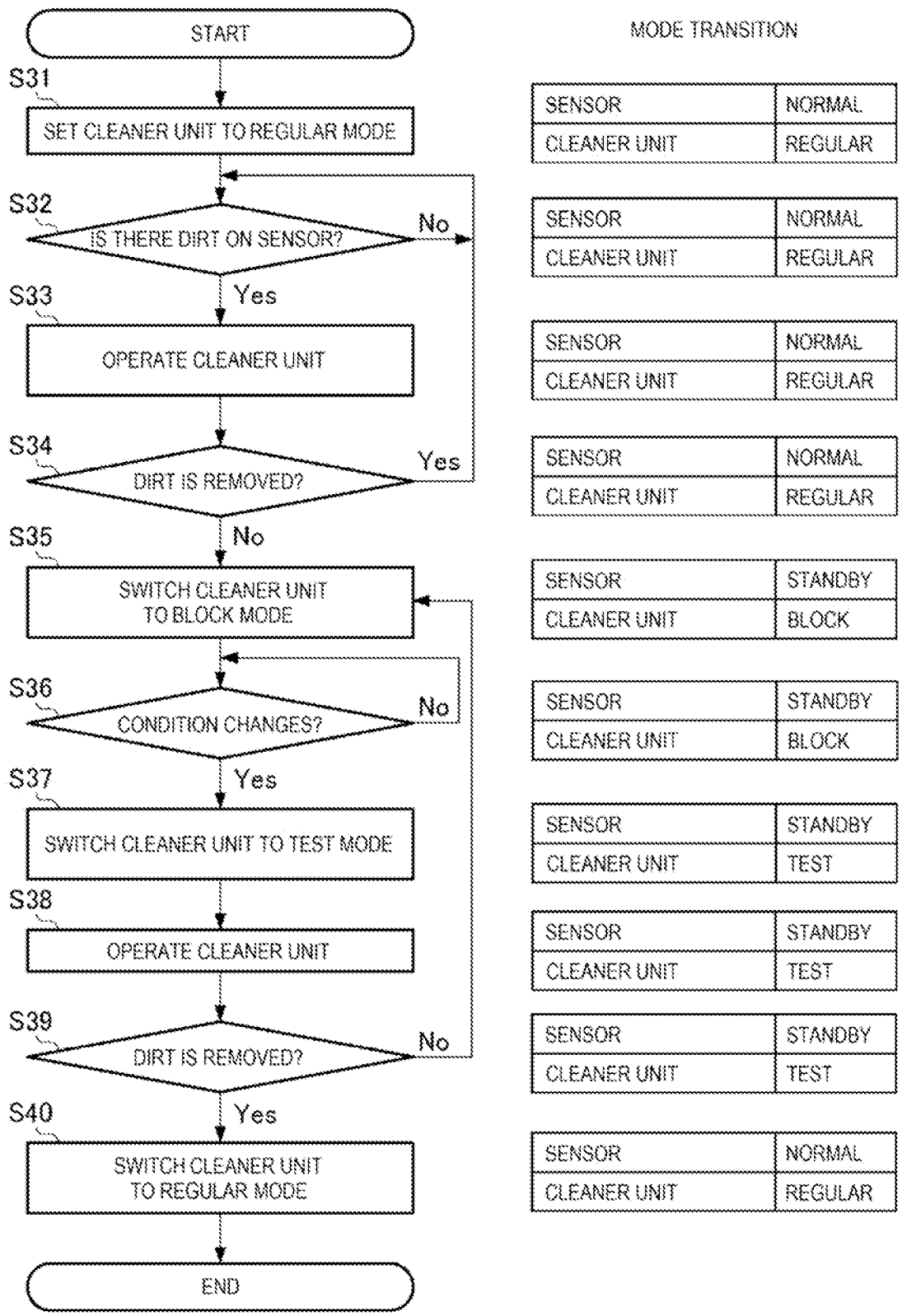
FIG. 17 is a flowchart showing processing executed by the sensor system according to the fifth embodiment.

FIG. 17 is a flowchart showing processing executed by a sensor system 100D according to a fifth embodiment. FIG. 15 is a block diagram showing the sensor system 100D according to the fifth embodiment. A mode set for the front camera 6*c* and the front camera cleaner 109*a* in each step is shown at the right side of the flowchart in FIG. 17.

In the sensor system 100D according to the fifth embodiment, the integrative control unit 230 is configured to function as a cleaner control unit configured to control the cleaner unit 110 similarly to the sensor system 100C according to the fourth embodiment. As shown in FIG. 15, the integrative control unit 230 of the sensor system 100D includes: the normal dirt determination unit 231 the fixed dirt determination unit 232; the condition change determination unit 233; the first mode-switching unit 234; a second mode-switching unit 235D; and the cleaner operation unit 236.

The normal dirt determination unit 231, the fixed dirt determination unit 232, the condition change determination unit 233, the first mode switching unit 234, and the cleaner operation unit 236 are similar to the respective units in the integrative control unit 230 according to the fourth embodiment.

As shown in FIG. 17, processing from step S31 to step S36 in the sensor system 100D is similar to the processing from step S21 to step S26 in the sensor system 100O shown in FIG. 16.

When it is determined that such change has occurred (Yes in step S36), the integrative control unit 230 causes the second mode-switching unit 135D to switch operation modes of the front camera cleaner 109*a* from the block mode to a test mode in step 437. The front camera cleaner 109*a* set to the test mode is brought into an input standby state in which the front camera cleaner 109*a* operates for more than a predetermined number of times in response to input of an operation signal. In the test mode, the cleaner unit 110 is set to operate for a predetermined number of times in response to an operation signal output from the integrative control unit 230.

Next, in step S38, the integrative control unit 230 causes the cleaner operation unit 236 to output an operation signal to the front camera cleaner 109*a* to operate the front camera cleaner 109*a* in order to remove dirt adhering to the front camera 6*c* for more than a predetermined number of times.

Next, in step S39, the integrative control unit 230 analyzes an image output from the front camera 6*c* to determine whether the dirt on the front camera 6*c* has been removed by cleaning by the front camera cleaner 109*a* performed for more than the predetermined number of times.

When it is determined that the dirt on the front camera 6*c* has not been removed (No in step S39), the second mode-switching unit 235D of the integrative control unit 230 returns to step 435 and switches operation modes of the front camera cleaner 109*a* from the test mode to the block mode. Then, the integrative control unit 230 repeats processing from step S35.

On the other hand, when it is determined that the dirt on the front camera 6*c* has been removed (Yes in step S39), the integrative control unit 230 proceeds to step S40.

In step S40, the second mode-switching unit 235D of the integrative control unit 230 switches operation modes of the flout camera cleaner 109*a* from the test mode to the regular mode. The front camera cleaner 109*a* set to the normal mode is brought into an input standby state in which the front camera cleaner 109*a* operates in response to input of an operation signal.

In the sensor system 100D according to the fifth embodiment, when it is determined that a predetermined condition under which an adhesion state of dirt on the external sensor 6 may change is satisfied in the cleaner unit 110 set to the block mode, the cleaner unit 110 is switched to the test mode to remove the dirt on the front camera be for more than a predetermined number of times, and when it is determined that the dirt has been removed, the cleaner unit. 110 is switched to the regular mode. According to this configuration, the cleaner unit 110 is not switched back to the regular mode until the predetermined condition under which dirt can be easily removed is satisfied and it is determined that dirt has been removed in the test mode. Therefore, vain operation of the cleaner unit 110 can be further prevented, thereby reducing power consumption of the system.

Various Modifications

Embodiments of the present invention have been described above. It goes without saying that a technical scope of the present invention should not be limitedly interpreted by the description of the embodiments. It is to be understood by those skilled in the art that the embodiments are simply examples and various modifications may be made within the scope of the invention described in the claims. The technical scope of the present invention should be determined based on the scope of the invention described in the claims and equivalents thereof.

Although the driving modes of the vehicle according to the a love embodiments include: the full automation mode; the advanced driver assistance mode; the driver assistance mode; and the manual driving mode the driving modes of the vehicle should not be limited to these four modes. The driving modes of the vehicle may include at least one these four modes. For example, only one driving mode of the vehicle may be executed.

Further, a classification and a name of the driving modes of the vehicle may be changed according to laws or regulations concerning self-driving in each country, as appropriate. Similarly, definitions of the "full automation mode," the "advanced driver assistance mode," and the "driver assistance mode" in the description of the embodiments are simply examples and may be changed according to laws or regulations concerning self-driving in each country, as appropriate.

Although the cleaner system 100 and the sensor systems 100A to 100D are mounted on a vehicle configured to travel in self-driving mode in the above embodiments, they may be mounted on a vehicle incapable of traveling in self-driving mode.

Although the cleaner system 100 includes the external sensor 6 in the above embodiments, the cleaner system 100 may not include the external sensor 6. However, the cleaner system 100 provided as a unit including the external sensor 6 is preferable since positioning accuracy of the cleaners 103 to 106, 109a, and 109b to the external sensor 6 can be improved. In addition, assemblability to the vehicle 1 is improved since the external sensor 6 can be attached to the vehicle 1 together with the cleaner system 100.

Although a device configured to clean the LiDARs 6f, 6b, 6r, and 6l, a device configured to clean the front camera 6c, and a device configured to clean the rear camera 6d have been described as a cleaner or an air curtain device configured to clean the external sensor 6 and prevent dirt from adhering to the external sensor 6 in the above embodiments, the present invention is not limited thereto. The cleaner system 100 may include a cleaner, an air curtain device, or the like configured to clean a radar and the like, instead of or together with the sensor cleaners 103 to 106, 109a, and 109b or may include the cleaner, the air curtain device.

The external sensor 6, such as the LiDARs 6f, 6b, 6r, and 6l, may have a detection surface and a cover covering the detection surface. A cleaner or an air curtain device configured to clean the external sensor 6 and prevent dirt from adhering to the external sensor 6 may be configured to clean the detection surface or to clean the cover covering the sensor.

The cleaning liquid ejected from the cleaner system 100 contains water or detergent. Cleaning media ejected toward the front window. If, the rear window 1b, the headlamps 7r and 7l, the LiDARs 6f, 6b, 6r, and 6l, and the cameras 6c and 6d may be different or the same.

The cleaners 101 to 109b are provided with one or more ejection ports for ejecting cleaning medium. The cleaners 101 to 109b may be provided with one or more ejection ports for ejecting the cleaning liquid and one or more ejection ports for ejecting air.

The cleaners 101 to 109b may be individually provided, or some of the cleaners may be unitized. For example, the right LC 105 and the right HC 107 may be a single unit. If the right headlamp 7r and the right LiDAR 6r are integrated, the right LC 105 and the right HC 107 may be a single unit.

The present application is based on Japanese Patent Application Nos. 2019-113845 and 2019-113846, filed on Jun. 19, 2019, the contents of which are incorporated herein by reference.

The invention claimed is:

1. A sensor system equipped with a vehicular cleaner comprising:
    a sensor configured to operate in a normal mode and a standby mode;
    a cleaner unit configured to clean the sensor in response to an operation signal output in accordance with a dirt determination result of the sensor; and
    a control unit configured to control the sensor and the cleaner unit, wherein
    the sensor is configured to operate in the normal mode, in which the sensor is operated at a predetermined cycle, and in the standby mode, in which the sensor is operated at a cycle longer than in the normal mode,
    the cleaner unit is configured to operate in a regular mode in which the cleaner unit operates in response to the operation signal and to operate in a block mode in which the cleaner unit does not operate even when the operation signal is input,
    the control unit includes:
        a fixed dirt determination unit configured to determine whether dirt on the sensor is removable by cleaning by the cleaner unit;
        a first mode-switching unit configured to switch the sensor from the normal mode to the standby mode when the fixed dirt determination unit determines that the dirt on the sensor is not removable;
        a sensor restoration determination unit configured to determine whether the dirt has been removed based on sensor output acquired in the standby mode when the sensor was operated in the standby mode; and
        a second mode-switching unit configured to switch the sensor back from the standby mode to the normal mode when the sensor restoration determination unit determines that the dirt on the sensor has been removed, and
    the control unit is configured to operate the cleaner unit in the regular mode when the sensor is in the normal mode and to operate the cleaner unit in the block mode when the sensor is in the standby mode.

2. The sensor system equipped with a vehicular cleaner according to claim 1, wherein
    the control unit further includes a normal dirt determination unit configured to output the operation signal to the cleaner unit when the cleaner unit is in the regular mode and it is determined that dirt is adhering to the sensor based on output of the sensor, and
    the normal dirt determination unit, the fixed dirt determination unit, the sensor restoration determination unit, the first mode-switching unit, and the second mode-switching unit are included in a sensor control unit configured to control the sensor and the cleaner unit based on a signal output from a vehicle control unit configured to control traveling of a vehicle.

3. The sensor system equipped with a vehicular cleaner according to claim 1, wherein
    the fixed dirt determination unit determines that the dirt on the sensor is not removable by the cleaning by the cleaner unit when:
        it is informed that the dirt has not been removed from the sensor even when the cleaner unit was operated for more than a predetermined number of times; or
        the cleaner unit has been operated for a predetermined number of times within a predetermined time.

4. A sensor system equipped with a vehicular cleaner comprising:
- a sensor mounted on a vehicle;
- a cleaner unit configured to clean the sensor in response to an operation signal output in accordance with a dirt determination result of the sensor; and
- a cleaner control unit configured to control the cleaner unit, wherein the cleaner unit is configured to operate in a regular mode in which the cleaner unit operates in response to the operation signal and to operate in a block mode in which the cleaner unit does not operate even when the operation signal is input, the cleaner control unit includes:
- a fixed dirt determination unit configured to determine whether dirt on the sensor is removable by cleaning by the cleaner unit;
- a first mode-switching unit configured to switch the cleaner unit from the regular mode to the block mode when the fixed dirt determination unit determines that the dirt on the sensor is not removable;
- a condition change determination unit configured to determine whether at least one of the following predetermined conditions is satisfied:
  - a predetermined time has passed since the first mode-switching unit switched the cleaner unit to the block mode;
  - weather has changed after the first mode-switching unit switched the cleaner unit to the block mode;
  - a temperature has changed by more than a predetermined value after the first mode-switching unit switched the cleaner unit to the block mode;
  - a vehicle speed has changed by more than a predetermined value after the first mode-switching unit switched the cleaner unit to the block mode; or
  - mileage has increased by more than a predetermined value since the first mode-switching unit switched the cleaner unit to the block mode; and
- a second mode-switching unit configured to switch the cleaner unit from the block mode to the regular mode when the condition change determination unit determines that the at least one of the predetermined conditions is satisfied.

5. A sensor system equipped with a vehicular cleaner comprising:
- a sensor mounted on a vehicle;
- a cleaner unit configured to clean the sensor in response to an operation signal output in accordance with a dirt determination result of the sensor; and
- a cleaner control unit configured to control the cleaner unit, wherein the cleaner unit is configured to operate in a regular mode in which the cleaner unit operates in response to the operation signal and to operate in a block mode in which the cleaner unit does not operate even when the operation signal is input, the cleaner control unit includes:
- a fixed dirt determination unit configured to determine whether dirt on the sensor is removable by cleaning by the cleaner unit;
- a first mode-switching unit configured to switch the cleaner unit from the regular mode to the block mode when the fixed dirt determination unit determines that the dirt on the sensor is not removable;
- a condition change determination unit configured to determine whether at least one of the following predetermined conditions are satisfied:
  - a predetermined time has passed since the first-mode switching unit switched the cleaner unit to the block mode;
  - weather has changed after the first-mode switching unit switched the cleaner unit to the block mode;
  - a temperature has changed by more than a predetermined value after the first-mode switching unit switched the cleaner unit to the block mode;
  - a vehicle speed has changed by more than a predetermined value after the first-mode switching unit switched the cleaner unit to the block mode; or
  - mileage has increased more than a predetermined value since the first-mode switching unit switched the cleaner unit to the block mode; and
- a second mode-switching unit configured to switch the cleaner unit to a test mode in which it is determined whether the dirt on the sensor has been removed after the cleaner unit operated for more than a predetermined number of times, and the second mode-switching unit is configured to switch the cleaner unit to the regular mode when it is determined that the dirt on the sensor has been removed in the test mode and to switch the cleaner unit to the block mode when it is determined that the dirt on the sensor has not been removed in the test mode.

* * * * *